United States Patent
Stoner, Jr. et al.

(10) Patent No.: US 10,521,863 B2
(45) Date of Patent: Dec. 31, 2019

(54) CLIMATE DATA PROCESSING AND IMPACT PREDICTION SYSTEMS

(71) Applicants: BDC II, LLC, Boulder, CO (US); SAND Investment Holdings, LLC, Boulder, CO (US)

(72) Inventors: Thomas Stoner, Jr., Boulder, CO (US); Pooja Khosla, Longmont, CO (US); David Schimel, Boulder, CO (US); Mark Labovitz, Superior, CO (US)

(73) Assignees: BDC II, LLC, Boulder, CO (US); SAND Investment Holdings, LLC, Boulder, CO (US)

( * ) Notice: Subject to any disclaimer, the term of this patent is extended or adjusted under 35 U.S.C. 154(b) by 0 days.

(21) Appl. No.: 16/107,702

(22) Filed: Aug. 21, 2018

(65) Prior Publication Data
US 2019/0066217 A1 Feb. 28, 2019

Related U.S. Application Data

(60) Provisional application No. 62/548,509, filed on Aug. 22, 2017.

(51) Int. Cl.
*G06Q 50/06* (2012.01)
*G06Q 40/06* (2012.01)

(52) U.S. Cl.
CPC ............ *G06Q 40/06* (2013.01); *G06Q 50/06* (2013.01)

(58) Field of Classification Search
None
See application file for complete search history.

(56) References Cited

U.S. PATENT DOCUMENTS

| 7,464,373 B1* | 12/2008 | Yunt | G06F 8/10 717/125 |
| 10,038,602 B2* | 7/2018 | Chen | H04L 41/5077 |
| 2009/0043653 A1* | 2/2009 | Sandor | G06Q 30/0242 705/14.41 |

(Continued)

OTHER PUBLICATIONS

"Environmental Economics, NERA Proprietary Models," NERA Economic Consulting, http://www.nera.com/practice-areas/environmental-economics/nera-proprietary-models.html.

(Continued)

*Primary Examiner* — William J Jacob
(74) *Attorney, Agent, or Firm* — DLA Piper LLP (US)

(57) ABSTRACT

The present disclosure generally relates to assessing climate change risk at a security level. A computing system receives a selection of a climate change scenario from a user operating a remote client device. The computing system generates one or more environmental metrics for one or more energy sources based on the scenario selected by the user. The computing system converts the one or more environmental metrics for the one or more energy sources into one or more profitability indicators. The computing system correlates at least one energy source of the one or more energy sources to each security. The computing system generates a projected climate change risk for each security based on the one or more environmental metrics for the one or more energy sources. The computing system provides a data set representing the projected climate change risk to the remote client device.

20 Claims, 14 Drawing Sheets

(56) References Cited

U.S. PATENT DOCUMENTS

| | | | | |
|---|---|---|---|---|
| 2011/0010208 | A1* | 1/2011 | Yekutiely | G06Q 10/06 705/7.37 |
| 2011/0016017 | A1* | 1/2011 | Carlin | G06Q 10/06 705/26.4 |
| 2011/0208621 | A1* | 8/2011 | Feierstein | G06Q 30/018 705/30 |
| 2011/0251933 | A1 | 10/2011 | Egnor et al. | |
| 2012/0166616 | A1* | 6/2012 | Meehan | G06Q 50/06 709/224 |
| 2012/0316916 | A1 | 12/2012 | Andrews et al. | |
| 2013/0262341 | A1* | 10/2013 | Bourne | G06Q 40/06 705/36 R |
| 2014/0278294 | A1* | 9/2014 | Yeager | G06F 17/5009 703/2 |
| 2015/0371151 | A1 | 12/2015 | Georgescu et al. | |
| 2016/0117774 | A1* | 4/2016 | Bateman | G06Q 40/06 705/36 R |
| 2016/0196513 | A1* | 7/2016 | Mallon | G06Q 10/0635 705/7.28 |
| 2016/0328723 | A1* | 11/2016 | Cunnane | G06Q 30/0201 |
| 2017/0161859 | A1* | 6/2017 | Baumgartner | G06Q 40/06 |
| 2017/0176640 | A1* | 6/2017 | Kodra | G01W 1/10 |

OTHER PUBLICATIONS

"Better Portfolio Decisions Portfolio & Risk Analytics Bloomberg Terminal," 2018, Bloomberg Finance L.P., https://www.bloomberg.com/professional/product/portfolio-risk-analytics/.

"The MSCI Macroeconomic Risk Model and Scenario Analysis Service, A New Toolkit to Measure the Impact of Macroeconomic Scenarios on Global Multi-Asset Class Portfolios," 2018, MSCI Inc., https://www.msci.com/msci-macroeconomic-risk-model.

Krouse, Sarah, "BlackRock Is Offering a Free Perk That Lets It See Inside Your Portfolio," Wall Street Journal, Jun. 18, 2018, https://www.wsj.com/articles/blackrock-is-offering-a-free-perk-that-lets-it-see-inside-your-portfolio-1529319601.

"Adapting Portfolios to Climate Change, Implications and Strategies for All Investors," BlackRock Investment Institute, Global Insights, Sep. 2016, https://www.blackrock.com/corporate/literature/whitepaper/bii-climate-change-2016-us.pdf.

"Investing in a Time of Climate Change," 2015, Mercer LLC, International Finance Corporation and the UK Department for International Development, https://www.mercer.com/content/dam/mercer/attachments/global/investments/mercer-climate-change-report-2015.pdf.

MSCI ESG Ratings, More Data, More Context, More Informed Decisions, Providing Institutional Investors with a More Robust ESG Integration Took to Help Them Mitigate Risk and Enhance Long Term Value Creation, 2018, MSCI, Inc., https://www.msci.com/documents/1296102/1636401/MSCI+ESG+Rating+Brochure-V3.pdf/f2b4a27a-58f5-42c7-880b-cf8201039eaa.

"ESG Data," Bloomberg, Impact Report, 2018, Bloomberg Finance L.P., https://www.bloomberg.com/impact/impact/esg-data/.

"S-Ray, Explore the Sustainability of the World's Biggest Companies," 2017, Arabesque, https://arabesque.com/s-ray/.

"CSRHub, Sustainability Management Tools, About CSRHub," 2018, CSRHUB, https://esg.csrhub.com/about-csrhub.

"En-ROADS Energy—Rapid Overview and Decision-Support Simulator," ClimateInteractive, https://www.climateinteractive.org/wp-content/uploads/2013/12/enroads2pager.pdf.

International Search Report and Written Opinion dated Nov. 2, 2018 of counterpart International Application No. PCT/US2018/047415.

Entelligent: Entelligent's Smart Climate Portfolio Optimizer, Smart Climate Data Solutions, Entelligent, Sep. 28, 2016, [retrieved on Oct. 12, 2018]. Retrieved from the internet: <URL: https://d3n8a8pro7vhmx.cloudfront.net/intentionalendowments/pages/1413/attachments/original/1480968842/Entelligent_Exec_WP.pdf?1480968842> pp. 1-8.

* cited by examiner

FIG. 14

CLIMATE DATA PROCESSING AND IMPACT PREDICTION SYSTEMS

CROSS-REFERENCE TO RELATED APPLICATION

This application claims priority from U.S. Provisional Application Ser. No. 62/548,509, filed Aug. 22, 2017, which is hereby incorporated by reference in its entirety.

TECHNICAL FIELD

The present disclosure relates to systems and methods for climate data processing and impact prediction, including, for example, financial impact and performance prediction, and more specifically to assessing climate change risk at a security level.

BACKGROUND

Uncertainty and unpredictability within environmental phenomenon, social phenomenon, and governance standards makes it difficult to understand their emerging trends, as well as the impact that the trends may have upon investments.

Nevertheless, there is a recent movement towards environmental, social, and governance standards (ESG) investing; investing that focuses on environmental, social and governance standards used by socially responsible investors in screening investments. An environmental aspect examines a company's performance regarding the environment. A social aspect examines a company's products and services and relationships with employees, customers and the community. A governance aspect examines a company's leadership, internal controls and shareholder rights. The recent movement and growth towards ESG investing is evidenced by the increase in the subsection of ESG focused exchange traded funds (ETFs).

Despite the interest in ESG investing, much of the data used to make decisions based on environmental, social and governance standards of a company is unreliable, as it is self-reported, and often non-quantifiable. For example, hundreds of firms are dedicated to analyzing and rating company ESG performance. However it is unclear what mechanism the firms utilize to analyze and rate company ESG performance. Furthermore, a majority of the ESG data used by firms is binary (yes/no) answers to questions related to corporate policies. The ESG data is compiled from self-reported information and so there is a lack of quantifiable metrics and the ability to compare between different companies. Accordingly, there exists a need for quantifiable metrics related to ESG investing.

Moreover, the environmental aspect of ESG investing has added uncertainty and unpredictability due to a changing climate. The impacts of climate change are far reaching and vast. Climate change has been associated with a rise in global sea levels, melting ice, thermal expansion (the war ruing of ocean water). Additionally, the rise in global sea levels, increase in melting ice and thermal expansion may interact with cyclical phenomenon such as El Niño and La Niña, thus compounding the volatility of local environment and global climate. Climate change creates new uncertainties for investors as rising global temperatures and sea levels may make weather patterns more difficult to predict. Additionally the global regulatory response to climate change adds uncertainty to the performance of investments. Moreover climate change may also increase the risk of modeling error to account for extreme weather risks. Accordingly, there remains a need for a way to better process climate data to understand climate phenomenon and the impact of climate phenomenon on investments.

Additionally, the changing environmental conditions contribute to stock market volatility as the changing environmental conditions may impact, for example, the oil prices that are central to the stock market. Accordingly there is a need for realistic valuations of both energy and non-energy companies in view of a changing climate and local environment and providing a quantitative evaluation of companies most likely to benefit or suffer from climate change. There is a need for systems and methods that are able to relate climate data to economic data and quantifiably measure the impact of climate change on economic investment.

SUMMARY

Embodiments disclosed herein generally relate to a system, method, and non-transitory computer readable medium for assessing climate change risk at a security level. A computing system receives a selection of a climate change scenario from a user operating a remote client device. The computing system generates one or more environmental metrics for one or more energy sources based on the climate change scenario selected by the user. The computing system converts the one or more environmental metrics for the one or more energy sources into one or more profitability indicators. The computing system retrieves one or more sets of financial information directed to one or more securities from one or more remote financial data sources. The computing system correlates at least one energy source of the one or more energy sources to each security of the one or more securities, by downward deploying the one or more profitability indicators of the one or more energy sources to the one or more sets of financial information of each security. The computing system generates a projected climate change risk for each security of the one or more securities based on the one or more environmental metrics for the one or more energy sources. The computing system provides a data set representing the projected climate change risk to the remote client device.

In one embodiment, the system may generate public equity indices and portfolio analysis tools. In one embodiment, the generated public equity indices may be benchmarked to one or more public indices such as the S&P 500 or the Russell 1000. In one embodiment, the system may uniquely leverage machine learning to neutralize climate change risk and integrate energy economics and financial analysis to optimize portfolio performance.

In one embodiment, the system may focus on impacts of climate change on equity portfolios using machine learning and artificial intelligence to model climate change related risks. The system may assist in determining changes in future energy subsector investments all the while considering capital expenditures, cost of infrastructure investments, and carbon emissions.

In one embodiment, the system may forecast the global usage and prices of various energy sources including for example, oil, coal, renewables (including, for example, solar and wind), nuclear, natural gas, and the like. The system may then analyze the effect of the global usage and prices of energy sources on the profitability of all industries and individual companies within the industry. In one embodiment, the predicted energy source behavior and profitability of industries and individual companies may be used to optimize portfolios for climate risk.

In one embodiment, the system may utilize a climate model, a global energy model and a dynamic system of equations. The exemplary system may allow multiple scenario generation and testing capacity, flexibility to generate customizable scenarios, the ability to align portfolios to low carbon scenarios, forecasted energy usage by type and price, adjustments for technology advancements and breakthroughs, aggregate level scenario sensitivities (by subsector and region), may calculate scenario sensitivities at individual security levels, and may provide the ability to optimize any broad-based market index.

BRIEF DESCRIPTION OF THE DRAWINGS

Many aspects of the present embodiments may be better understood with reference to the following drawings. The components in the drawings are not necessarily to scale, emphasis instead being placed upon illustrating example embodiments:

FIG. 14 is a screen shot illustrating an example graphical user interface, according to one exemplary embodiment.

DETAILED DESCRIPTION

Figure 1:
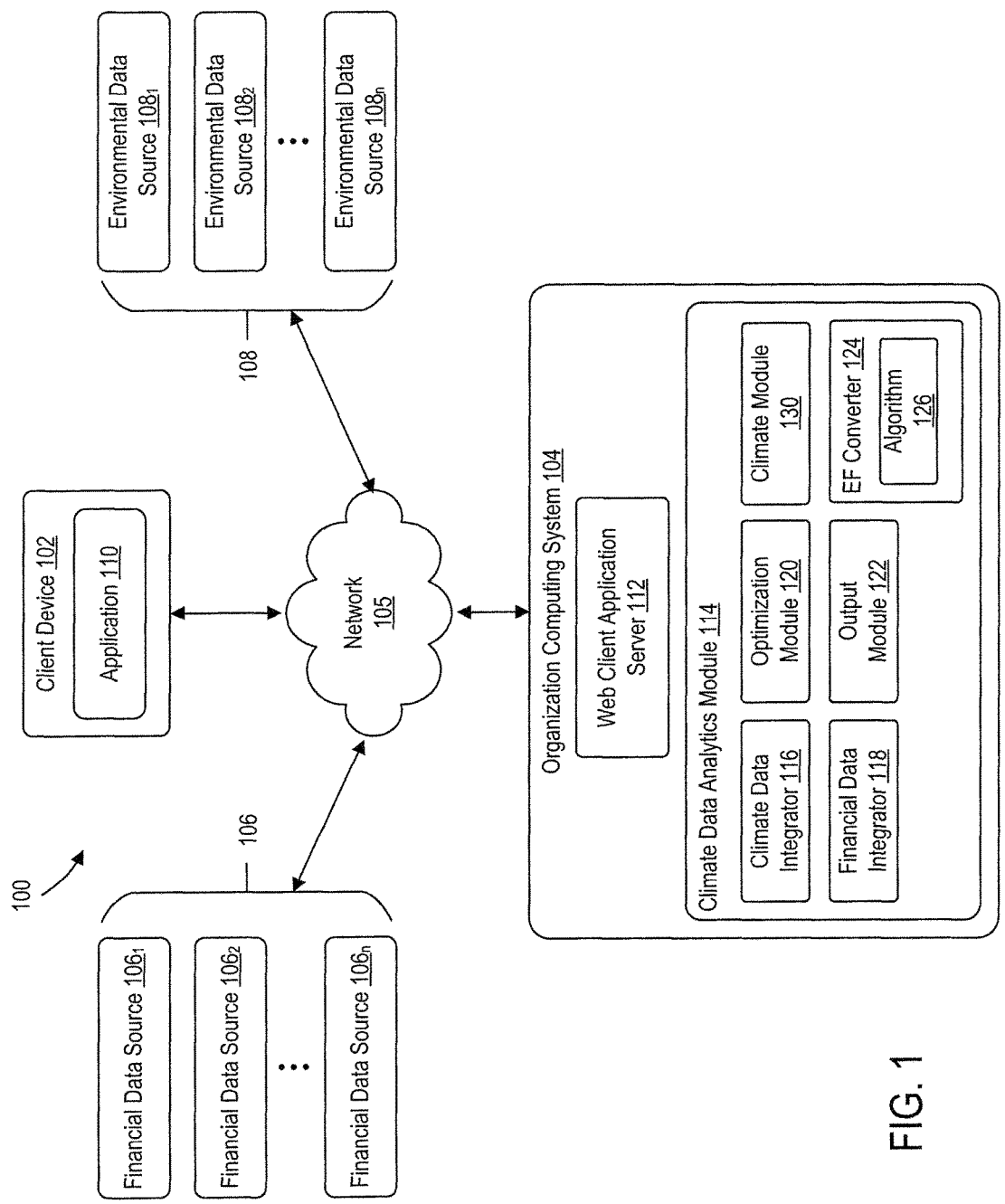
FIG. 1 is a functional block diagram illustrating a computing environment for climate data processing and impact predication, according to one exemplary embodiment.

As discussed above, the impacts of climate change may alter the behavior of energy sources and impact the profitability of industries and individual companies. Thus, in order to allocate investments within investment portfolios that mitigate for the short-term and long-term impacts of climate change, it is beneficial to quantitatively understand the impact of temperature changes, greenhouse gas emissions, and carbon emissions on investments.

One or more techniques disclosed herein generally relate to a system and method of climate data processing and impact prediction, including, for example, financial impact and performance prediction. More specifically, the one or more techniques disclosed herein use climate data processing and impact prediction to assess climate change risk at a security level. Conventional approaches to climate data processing and impact predicting rely on a "bottom-up" approach. In other words, conventional approaches begin at a company (or security) level, and rely on self-reported information to perform data processing. These conventional techniques typically result in a lack of quantifiable metrics and an inability to compare climate data processing and impact prediction across two or more companies.

The systems and techniques of the present disclosure eliminates the conventional "bottom-up" approach. Instead, systems/techniques of the present disclosure implement a "top-down" approach. The "top-down" approach includes the downward correlation between one or more energy sources and one or more companies. In particular, the one or more techniques discussed herein begin at an energy source level, by treating each energy source as its own entity. Climate data may then be generated for each energy source based on one or more scenarios selected by an end user. The claimed system then converts the generated climate data for each energy source into one or more profitability indicators. The climate data to financial data conversion allows the system to downward correlate each energy source to a respective industry subsector, by using historical price returns of each industry subsector. Within each industry subsector, the present system can identify one or more companies to which each energy source maps. From this information, the present system is able to predict future returns for each company and use the predicted future returns to assess climate change risk for the company. In other words, the downward correlation or downward deployment may be thought of as a translating of profitability and risk signals associated with each energy source (a first level) to one or more securities and portfolios (a second level).

In some embodiments, climate data may be generated for one or more policies and/or scenarios specified by a user. For example, climate data may be generated for each specific policy, socio-economic scenario, and/or macro-economic scenario specified by the user. For each policy/scenario, an energy mix may be determined. From the energy mix, the system may generate one or more metrics, such as, but not limited to, energy supply, energy demand, energy prices, energy costs, and the like. The one or more metrics may be used for further interpolation of the financial data/profitability indicators at an energy source level.

Accordingly, the one or more techniques discussed herein eliminates any dependency on companies to self-report or provide ESG information.

Additionally, such evaluation of climate risk assessment based on global climate inputs performed using the one or more techniques disclosed herein improves upon conventional systems, by providing a climate forecast based on profitability indicators under one or more scenarios selectable by an end user. Such assessment may provide investors with valuable information, such as the climate risk associated with such investment, under various scenarios. Such an evaluation of climate risk assessment, contrary to conventional systems and techniques, is predictive (i.e., forward-looking), is able to provide end users (e.g., investors) risk information that a security (or an investment) may be susceptible to climate change over time, and according to a determination that is based on exposure to one or more energy sources (as opposed to at a company level-via the bottom up approach).

FIG. 1 is a functional block diagram illustrating a computing environment 100, according to one exemplary embodiment. As illustrated, computing environment 100 includes at least one client device 102, an organization computing system 104, one or more financial data sources $106_1$, $106_2$, and $106_n$ (generally "data sources 106"), and one or more environmental data sources $108_1$, $108_2$, and $108_n$ communicating via network 105.

Network 105 may be of any suitable type, including individual connections via the Internet such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore, the network connections may be selected for convenience over security.

Network 105 may include any type of computer networking arrangement used to exchange data. For example, network 105 may include the Internet, a private data network, virtual private network using a public network and/or other suitable connection(s) that enables components in computing environment 100 to send and receive information between the components of environment 100. Although one network 105 is illustrated in FIG. 1, it is understood that network 105 may include one or more interconnected networks.

Client device 102 may be operated by a user (or customer). For example, client device 102 may be representative of a mobile device, a tablet, a desktop computer, workstation or any computing device or computing system having the capabilities described herein. Client device 102 may include at least application 110. Application 110 may be representative, for example, of a web browser that allows access to a website or a stand-alone application. Client device 102 may access application 110 to access one or more functionalities of organization computing system 104.

Client device 102 may communicate over network 105 to request a webpage, for example, from web client application server 112 of organization computing system 104. For example, client device 102 may be configured to execute application 110 to access content managed by web client application server 112. The content that is displayed to client device 102 may be transmitted from web client application server 112 to client device 102, and subsequently processed by application 110 for display through a graphical user interface (GUI) generated (or rendered) by client device 102.

Organization computing system 104 may include at least web client application server 112 and climate data analytics module 114. Climate data analytics module 114 may be configured to predict the performance of one or more companies based on a predicted environmental state. Climate data analytics module 114 may include climate data integrator 116, a financial data integrator 118, optimization module 120, output module 122, environmental-to-financial (EF) converter 124, and climate module 130.

Each of climate data integrator 116, a financial data integrator 118, an optimization module 120, an optimization module 122, an environmental-to-financial (EF) converter 124, and climate module 130 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code a processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Climate data integrator 116 may be configured to receive climate related data from one or more environmental data sources 108. As illustrated, organization computing system 104 may be in communication with one or more environmental data sources 108.

One or more environmental data sources 108 may be representative of one or more computer systems hosting environmental data. Such environmental data sources 108 may include, but are not limited to governmental and international organizations and their databases such as the United States Energy Information Administration (US EIA), the International Monetary Fund's World Economic Outlook (IMF WEO), the US Department of Energy (DOE), the United Nations (UN), the International Energy Agency (IEA), and the National Air and Space Administration's Goddard Institute for Space Studies (NASA GISS).

In some embodiments, one or more environmental data sources 108 may further include academic and research institutes such as the Massachusetts Institute of Technology (MIT). Academic and research institutes may provide climate or financial related databases and models such as MIT's Emissions Prediction and Policy Analysis model (MIT EPPA). Climate data integrator 116 may retrieve from one or more environmental data sources 108 climate or environmental data such as atmospheric carbon dioxide levels, global surface temperatures, gross domestic product (GDP), population, energy intensity of GDP, carbon intensity of energy, carbon dioxide emissions from energy, measures of the effect of technological progress on energy, measures of the effect of energy price on energy intensity, cost by electrical source, electrical generation by energy source, and fraction of revenue put into process research and development by energy source.

In some embodiments, one or more environmental data sources 108 may include sources of corporate social responsibility (CSR) ratings or other environmental, governance, political, geographic, and social metrics. Other data may include financial and other security level data from FACT-SET®. In some embodiments, other data may include regulatory reports filed to the Securities and Exchange Commission (SEC), company disclosures through press releases, corporate sustainability reports, industry specific information such as Integrated Resource Plans filed by electric utilities, analyst reports, self-reported climate disclosure reports and other commercial and non-profit sources of information.

In some embodiments, one or more environmental data sources 108 may further includes the carbon dioxide information analysis center (CDIAC) of the National Climatic Data Center (NCDC), the National Ocean and Atmospheric Administration (NOAA) and the International Panel on Climate Change (IPCC). In one embodiment, data related to selected features may be extracted from the climate related data at climate data integrator 116. Selected features may include one or more of the projected gross domestic product (GDP) level, carbon tax, and the subsidy on renewables.

Climate data integrator 116 may be configured to aggregate and process the environmental and/or climate information received from one or more environmental data sources 108.

Financial data integrator 118 may configured to retrieve financial data from one or more financial data sources 106. As illustrated, organization computing system 104 may be in communication with one or more financial data sources 106.

One or more financial data sources 106 may be representative of one or more computer systems hosting environmental data. Such environmental data sources 106 may include, but are not limited to, stock exchanges, academic journals and the like. Data retrieved may also include economic data such as gross domestic product (GDP), interest rates, data on taxes and subsidies, energy prices, and carbon prices.

In some embodiments, such financial data sources 106 may further include data on the return and performance of securities such as FACTSET®. In some embodiments, financial data integrator 118 may collect data on companies listed on major stock exchanges such as the New York Stock Exchange (NYSE), NASDAQ, the Toronto Stock Exchange (TSX), the Toronto Stock Exchange-Venture (TSX-V), the London Stock Exchange (LSE), the Stock Exchange of Hong Kong (SEHK), and the Australian Securities Exchange (ASX). Financial data integrator 118 may be configured to determine returns for each of the constituents along with the mean returns for all constituents.

In one embodiment, financial data sources 106 may collect data regarding the constituents of an index. In one embodiment, the impact of climate change on investments may be determined and recalculated on a quarterly basis, although any suitable time period may be used. The constituents of the index may differ for each recalculation. The financial data may include data spanning a number of months or years. In one embodiment, the financial data may include historical returns for securities for at least eight historical years. In one embodiment, securities with limited data (e.g., securities with less than six months of data) may be excluded. In one embodiment, securities demonstrating un-realistic returns may be excluded.

Climate module 130 may be configured to receive climate data from climate data integrator 116. In some embodiments, climate module 130 may simulate the future price, supply, and demand for energy sources using data received from climate data integrator 116. Such energy sources may include oil, gas, coal, biofuels, renewable fuel, renewable electric, hydro, new technology and nuclear. In some embodiments, climate module 130 may take as input from, for example, client device 102, a scenario upon which to base the analysis. Accordingly, climate module 130 is configured to project climate data for each energy source based on the selected scenario.

EF converter 124 may be configured to receive output from climate module 130, and convert the output received from climate module 130 into one or more profitability indicators. In other words, EF converter 124 may be configured to convert climate related metrics into financial related metrics. By converting climate related metrics for each energy source into financial related metrics, climate data analytics module 114 may generate one or more indicators for each energy source as if each energy source represents a company or business subsector.

EF converter 124 may use the simulations of the future price and demand for energy sources produced by the climate module 130 to generate a profitability estimate. In some embodiments, the profitability estimation is based on one or more algorithms 126 (e.g., a system of difference equations). The profitability simulations executed by EF converter 124 may generate financial time series values such as net present value (NPV), return on investment (ROI), debt coverage ratio (DCR), and internal rate of return (IRR) for each of the one or more energy sources. The financial time series values may be based on an estimate of the total revenue of energy sources and the total cost of investment in energy sources.

In some embodiments, the total revenue of energy sources may be based upon energy demand and price that accounts for macro-economic indicators such as GDP, population, average overall cost of supply, energy supply capital lifetime and discount rate percentage, climate change indicators such as temperature, sea level estimates, amount of greenhouse gas emissions (GHG), and water consumption, as well as policy indicators such as carbon price, subsidies and GDP, population, interest rates, capital efficiency.

Optimization module 120 may generate company level predictions by downward deployment of the profitability indicators generated for each energy source to a security level data. In other words, optimization module 120 may correlate each energy source with one or more business subsectors based on the profitability indicators generated by EF converter 124. In some embodiments, optimization module 120 may identify the most correlated energy sources under one or more scenarios (e.g., a business as usual scenario, a carbon emission scenario, etc.) for each security.

In some embodiments, after optimization module 120 identifies the industry subsectors correlated to each energy source, optimization module 120 may downward deploy the information another level, by correlating companies within each subsector to a particular energy source. Such company level correlations may be made based on, for example, comparative positioning of companies within the industry subsector. Companies may be comparatively positioned within an industry subsector based on, for example, their size, growth, and/or volatility within the subsector. In one embodiment, optimization module 120 may utilize statistical models such as, but not limited to Monte-Carlo simulations, to test the identified industry subsector's most correlated energy categories (discussed further below).

In some embodiments, once optimization module 120 correlates each energy source to a business subsector, optimization module 120 may be configured to project environmental performance of the business subsector, based on the related climate data of the correlated energy source generated by climate module 130.

Output module 122 may be configured to provide a scoring based, for example, on a company's exposure to the energy industry and climate change using environmental, social and governance (ESG) metrics and the results from the optimization module 120. The scoring may provide a quantitative and objective means for comparing the performance of different companies in accordance with ESG standards.

In some embodiments, output module 122 may produce a website, accessible by one or more users via application 110 executing on client device 102. The website may provide a dashboard that allows users to view results generated by climate module 130, EF converter 124, and/or optimization module 120. In some embodiments, output module 122 may generate one or more data files for electronic transfer to client device 102. EF converter 124 may provide the output produced by output module 102 to one or more client devices 102. In some embodiments, the results from the optimization module 120 may be used to project portfolio performance relative to multiple emission scenarios, optimize a portfolio based on selected scenarios, and climate and energy risk parameters associated with the selected scenarios.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Those skilled in the art will appreciate that organization computing system 104 may be configured with more or less modules to conduct the methods described herein with reference to FIGS. 2-6. As illustrated in FIGS. 2-6, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 2-6 may be performed by one or more specialized processing components associated with components 112-130 of organization computing system 104 of FIG. 1.

Figure 2:
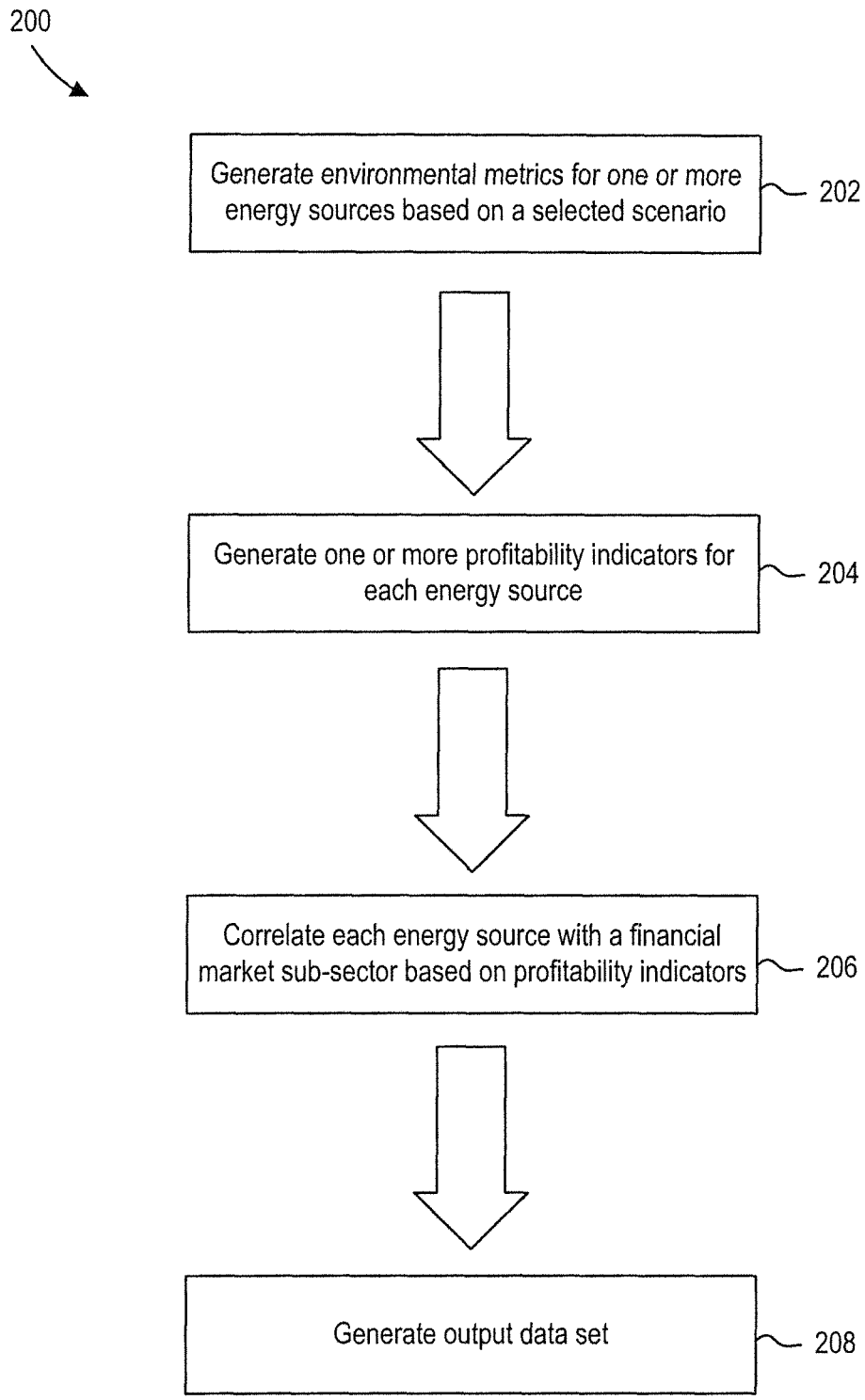
FIG. 2 is a flow diagram illustrating a method of climate data processing and impact prediction, according to one exemplary embodiment.

FIG. 2 is a flow diagram illustrating a method 200 of climate data processing and impact prediction, according to one exemplary embodiment. As illustrated, method 200 may have four phases.

At phase 202, climate data analytics module 114 may generate one or more environmental metrics for one or more energy sources based on a selected scenario. The one or more operations implemented at phase 202 are discussed in further detail below, in conjunction with FIG. 3.

At phase 204, climate data analytics module 114 may generate one or more profitability indicators for each of the one or more energy sources. For example, climate data analytics module 114 may generate the one or more profitability indicators based on the one or more environmental metrics generated during phase 202. The one or more operations implemented at phase 204 are discussed in further detail below, in conjunction with FIG. 4.

At phase 206, climate data analytics module 114 may correlate each energy source with a financial subsector based on the one or more profitability indicators. For example, climate data analytics module 114 may downward deploy the profitability indicators generated in phase 204 to one or more financial subsectors down to one or more companies within each financial subsector. The one or more operations implemented during phase 206 are discussed in further detail below, in conjunction with FIG. 5.

At phase 208, climate data analytics module 114 may generate an output data set for a user. For example, climate data analytics module 114 may provide a scoring based on a company's exposure to the energy industry and climate change using environmental and social and governance (ESG) metrics. The one or more operations implemented during phase 208 are discussed in further detail below, in conjunction with FIG. 6.

Figure 3:
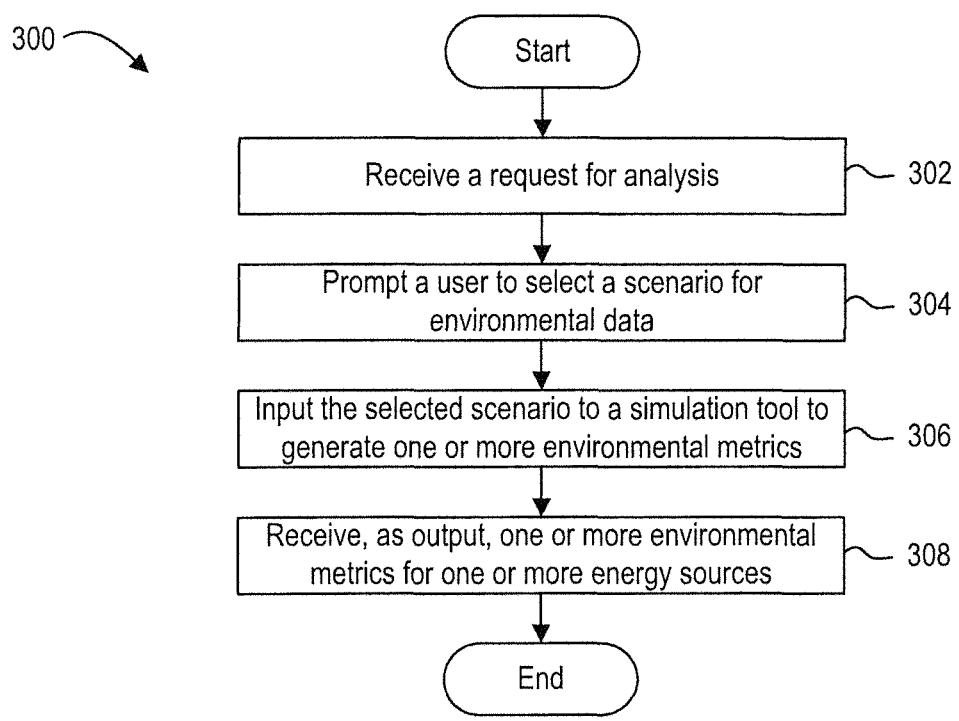
FIG. 3 is a flow diagram illustrating a method of one or more operations included in a first phase of the method discussed in FIG. 2, according to one exemplary embodiment.

FIG. 3 is a flow diagram illustrating a method 300 of operation during phase 202, according to one exemplary embodiment. Method 300 may begin at step 302.

At step 302, organization computing system 104 may receive a request for analysis from client device 102. In some embodiments, organization computing system 104 may receive the request for climate impact prediction via a website accessed by client device 102 via application 110 executing thereon.

At step 304, organization computing system 104 may prompt the user of client device 102 to select one or more scenarios for the climate impact prediction. Possible scenarios may include a carbon-minimum scenario, a carbon-maximum scenario, and a business as usual scenario. In one embodiment, the scenario may be selected by an automated program. A carbon-minimum scenario may be associated with an approximately 2.8 degree temperature increase in average global temperature. A carbon-maximum scenario may be associated with an approximately 4.6 degree temperature increase in average global temperature. A business as usual scenario may be determined by the United States Department of Energy.

The scenario selection may specify metrics related to the growth of population, gross domestic product (GDP) per capita, greenhouse gas (GHG) emissions, and removals other than $CO_2$ emissions. The user may also specify policy changes, including a carbon price, subsidy, or tax aimed at a particular energy source, policies for more rapid improvement in end-use energy efficiency, utility performance standards, technical breakthroughs affecting the cost and carbon intensity of particular energy sources, or an earlier retirement of existing energy supply sources. The climate data input into the climate model 111 may include indicators such as gross domestic product (GDP), energy source tax and subsidies, interest rates, and capital efficiency percentage. The energy sources may include, without being limited to, coal, gas, oil, renewables, hydro, nuclear, new tech, and biofuel. Climate models including ensemble models may be used to generate the profitability indicators.

At step 306, organization computing system 104 may input one or more metrics associated with the selected one or more scenarios to generate one or more environmental metrics for each energy source. For example, climate module 130 may input the one or more metrics into an energy-climate policy simulator.

In some embodiments, climate module 130 may input the one or more metrics into an Energy-Rapid Overview and Decision-Support (En-ROADS) simulator, available from Climate Interactive©. Climate module 130 may leverage En-ROADS simulator to provide information relating to changes in global GDP, energy efficiency, R&D results, carbon price, fuel mix, and other factors will change carbon emissions and impacts on global climate, such as temperature change. En-ROADS simulator may receive, as input from climate module 130, a measure of global GDP, energy efficiency, R&D results, carbon price, fuel mix, and the like. Such inputs may be received by climate module 130 from climate data integrator 116.

In some embodiments, climate module 130 may utilize a specialized software configured to execute simulations with improved model quality, data connections, and advanced algorithms. In some embodiments, En-ROADS simulator may be utilized with Vensim programming. En-ROADS simulator and other energy-climate policy simulations may apply the principles of system dynamics modeling. In some embodiments, the En-ROADS model may solve a system of nonlinear ordinary difference equations by Euler integration to generate one or more output values. In some embodiments, the En-ROADS model may be configured to solve a system of nonlinear ordinary difference equations by Euler integration using a time step of one-eighth of a year. In some embodiments, the En-ROADS simulator may start at 1990 and simulate through 2100.

Using the En-ROADS simulator, climate module 130 may produce a solution horizon that is recursive-dynamic, and determine a solution that is a partial equilibrium that accounts for price elastic demand, and incorporating short and long term supply, demand, and pricing effects. Although the En-ROADS simulator may be capable of performing computationally intensive sensitivity analysis using, for example, Monte Carlo optimization, in some embodiments, climate module 130 may be configured to utilize simple scenario simulations. In some embodiments, the climate module 130 may execute En-ROADS simulator locally within organization computing system 104. In some embodiments, climate module 130 may execute En-ROADS simulator as a part of a networked computing environment 100.

Climate module 130 may generate a market price of delivered fuels, demand of delivered fuels, average embodied fixed cost of fuel capacity, instant variable cost of fuel supply, carbon tax for delivered fuels, source subsidy for delivered fuels over time, fuel completing capacity, actual retirement rate, and delivered fuel capital lifetime for each fuel type. Climate module 130 may also generate a measure of the market price of electricity and the production for electricity, average embodied fixed cost of electric capacity, instant variable coast of electric supply, source subsidy to electric producers over time, electricity completing capacity, actual retirement rate, and electric supply capital lifetime for each electric source.

At step 308, organization computing system 104 may receive, as output, one or more environmental metrics for each of the one or more energy sources. For example, climate module 130 may generate one or more environmental metrics for each of oil, gas, coal, biofuels, renewable fuel, renewable electric, hydro, new technology, and nuclear energy sources.

Figure 4:
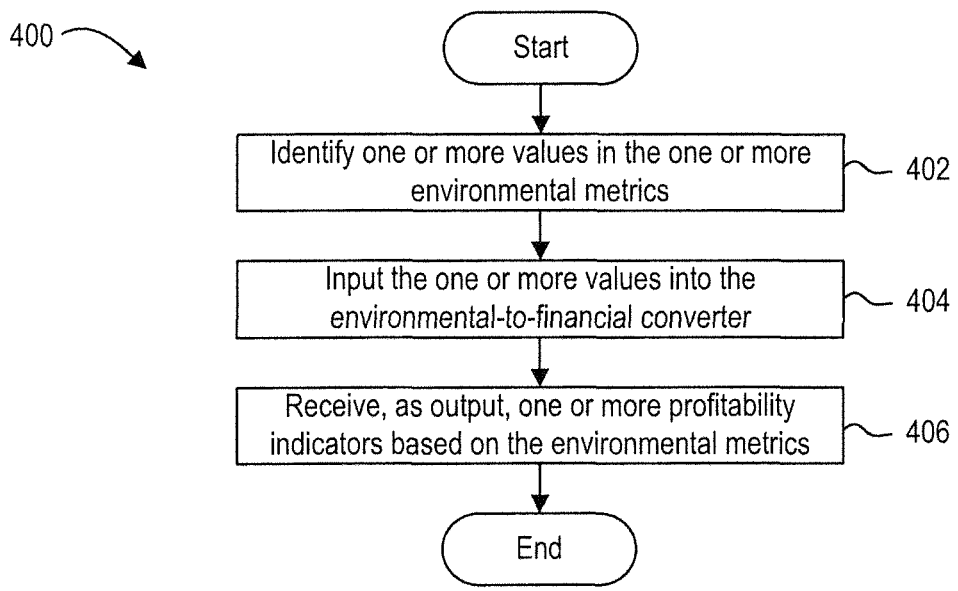
FIG. 4 is a flow diagram illustrating a method of one or more operations included in a second phase of the method discussed in FIG. 2, according to one exemplary embodiment.

FIG. 4 is a flow diagram illustrating a method 400 of operation during phase 204, according to one exemplary embodiment. Method 400 may begin at step 402.

At step 402, climate data analytics module 114 may identify one or more values in one or more environmental metrics. For example, EF converter 124 may identify one or more profitability indicators to be generated. For each profitability indicator, optimization module 120 may identify those environmental metrics output by climate module 130 that may be used to generate each of the one or more profitability indicators. Using a specific example, to generate net present value (NPV), EF converter 124 may identify one or more metrics associated with internal cost of the energy source.

At step 404, climate data analytics module 114 may input the one or more metrics output by climate module 130 into EF converter 124. For example, EF converter 124 may generate one or more profitability indicators for each energy source under each scenario based on the one or more metrics output by climate module 130.

EF converter 124 may generate one or more profitability indicators, such as absolute annualized capital cost, absolute variable cost, absolute revenue, gross margin, and unit gross margin using algorithm 126. Additionally, for capital installed at a specified year for each delivered fuel type and for each source of electricity EF converter 124 may generate one or more profitability indicators related to, without being limited to, the capacity of the investor, the investor gross margin, the equivalent overnight capital costs, investment, equity, debt, investor net cash flow, net present value (NPV), internal rate of return (IRR), and the return on investment (ROI). In some embodiments, EF converter 124 may generate the total NPV and a weighted average of IRR and ROI for all of the constituents.

Accordingly, the profitability indicators generated by the EF converter 124 may include a measure of the NPV, ROI, DCR, IRR and the like for each of the one or more energy sources. In one embodiment the generated profitability indicators may be reflect regional variability.

At step 406, climate data analytics module 114 may receive, as output, one or more profitability indicators based on the environmental metrics. For example, climate data analytics module 114 may receive from EF converter 124 one or more profitability indicators generated by providing metrics generated by climate module 130 into algorithm 126. The one or more profitability indicators provide a financial outlook for each energy source as if each energy source was a given financial subsector or company.

Figure 8:
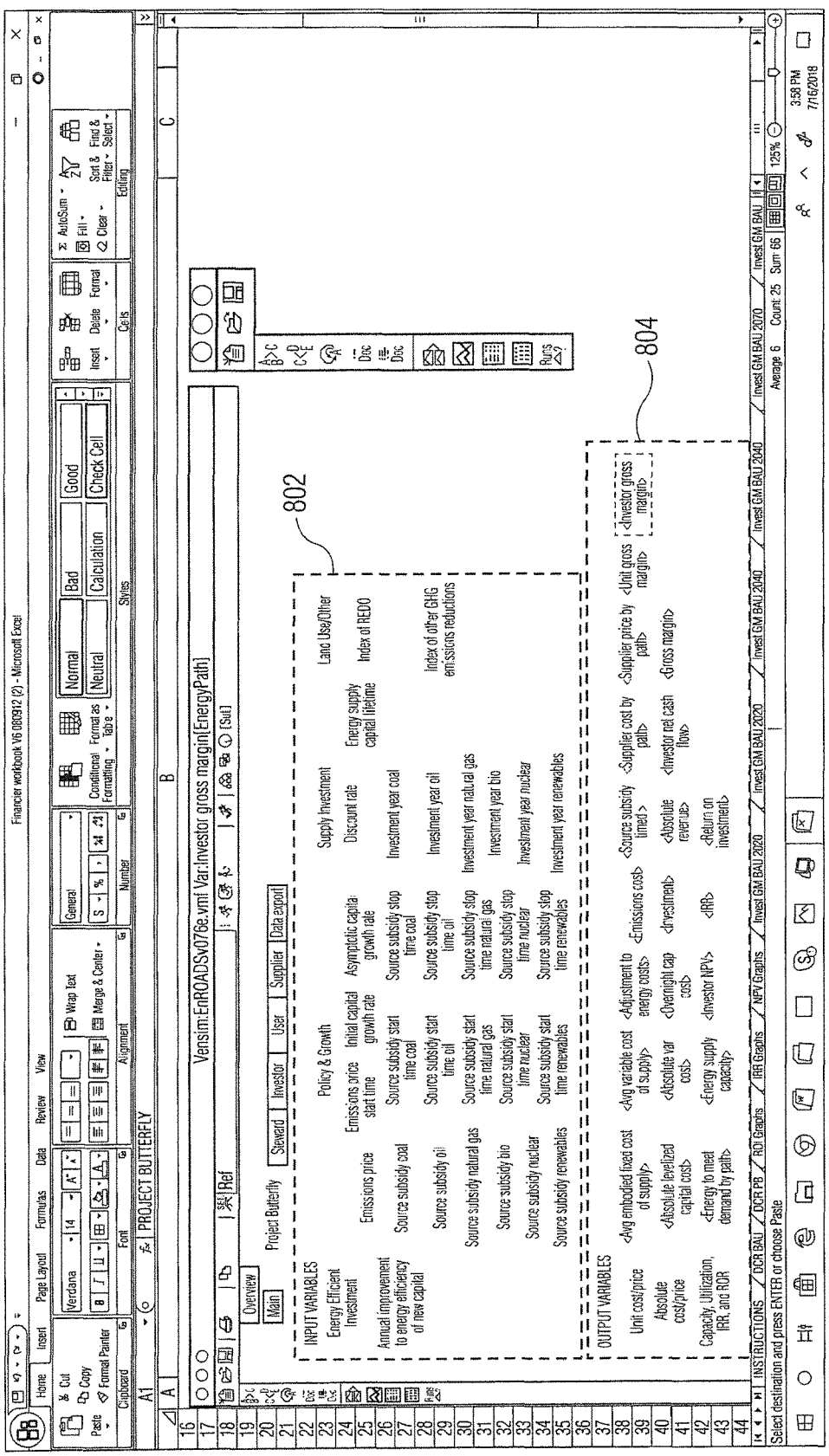
FIG. 8 is a screen shot illustrating an example graphical user interface, according to one exemplary embodiment.

FIG. 8 is a screen shot illustrating example graphical user interface (GUI) 800, according to one exemplary embodiment. As illustrated in GUI 800, there may be one or more inputs 802 and one or more outputs 804. One or more inputs 802 may correspond to the one or more environmental metrics generated by climate module 130, discussed above in conjunction with FIG. 3. One or more outputs 804 may correspond to the one or more profitability indicators generated by climate data analytics module 114.

Figure 5:
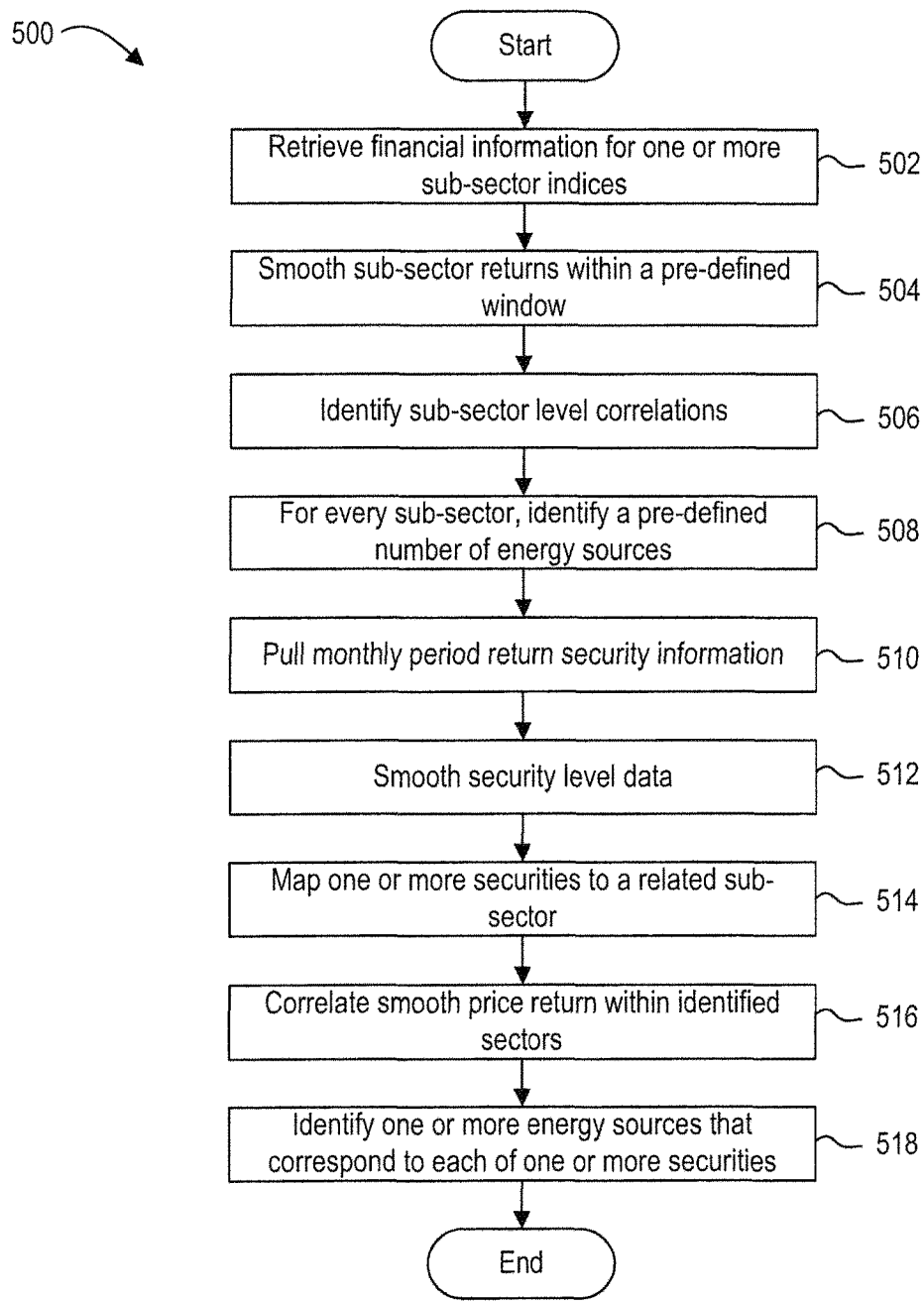
FIG. 5 is a flow diagram illustrating a method of one or more operations included in a third phase of the method discussed in FIG. 2, according to one exemplary embodiment.

FIG. 5 is a flow chart illustrating a method 500 of operations during phase 206, according to one exemplary embodiment. Method 500 may begin at step 502.

At step 502, climate data analytics module 114 may retrieve (e.g., pull) financial information from one or more subsector indices. For example, financial data integrator 118 may retrieve from one or more financial data sources 106 the financial data of one or more subsector indices. In some embodiments, the one or more data sources 106 hosting the financial data may be global industry classification standards (GICS) developed by Morgan Stanley Capital International (MSCI). In some embodiments, financial data integrator 118 may retrieve financial information for 24 GICs subdivisions). Climate data analytics module 114 may further retrieve ROI information under one or more pre-selected scenarios (e.g., business-as-usual).

In some embodiments, financial data integrator 118 may identify a portfolio including a list of securities. In some embodiments, the list of securities may correspond with a benchmark such as the S&P 500, Russell 100 or the like. In some embodiments, the climate data analytics module 114 may be provided with the data set from a user computer. In some embodiments, the portfolio or benchmark of interest may be selected based on an index requirement. The index requirement may be based on a Market Focus (i.e., Domestic, International), Fund theme (i.e., Sector of Interest: Technology, Energy), Factor Choices (i.e., Growth, Value) and the like. Once identified, climate data analytics module 114 may request data and information related to the list of securities from one or more financial data source 106 in communication with the climate data analytics module 114. Data sources that provide data and information related to the list of securities may include financial data and software resources that provide real-time news and quotes, company and portfolio analysis, multi-company comparisons, industry analysis, company screening, portfolio optimization and simulation, predictive risk measurements, alphatesting and tools to value and analyze fixed income securities and portfolios. This data and information may include financial data and information.

In some embodiments, the financial data integrator 118 may perform the discussed identification and retrieval steps. Financial data integrator 118 may pull time series data on stock prices for a benchmark, calculate the returns from the time series data on stock prices for the benchmark, calculate the average returns for specific securities within the benchmark and find the downside variance-covariance of all individual securities within the benchmark based on Sortino ratios. The financial data integrator 118 may also determine one or more of a data sets' minimum and maximum weights, sector diversity and financial risk coefficients.

At step 504, climate data analytics module 114 may smooth the retrieved financial information within a predefined window. For example, optimization module 120 may smooth the retrieved financial information for the one or more subsector indices with a five-point window locally weighted regression using, for example, data from a previous range of years (e.g., the previous 6 years). Exemplary weighted regressions may include locally weighted regressions such as, but not limited to, a locally weighted scatterplot smoothing (LOWESS). Smoothing the retrieved financial information aids in identifying relationships among variables, as well as trends in the information.

At step 506, climate data analytics module 114 may downward deploy the one or more profitability indicators generated by EF converter 124 to one or more financial subsectors, to identify sector level correlations. Optimization module 120 may identify correlations between the one or more energy sources and one or more financial subsectors using, for example, Kendall's tau coefficient. Kendall's tau coefficient is used to measure association between the one or more profitability indicators of each energy source and the financial information of the one or more financial subsectors. Kendall's tau coefficient may provide a ranking of relevance between each financial subsector and each energy source.

Such operations may include:

```
def plot_smoothing ( ):
    fig = plt.figure (figsize= (20,12))
    timely_sec = sec.loc [2003:2018]
    for idx, ind in enumerate (timely_sec.columns [20:24]):
        smoothed = ent.smooth (timely_sec.loc[:,ind],5)
        ax = fig.add_subplot (2,2,idx+1)
        ax.plot(timely_sec.loc[:,ind],'k=.', linewidth=1)
        ax.plot(smoothed, 'r',linewidth=2)
        ax.set_title(timely_sec.loc[:,ind] .name, size=18)
        ax.set_xlabel('Year',size=18)
        ax.set_ylabel('Qtrly Period Ret Propn',size=18)
        ax.tick_params(labelsize=18)
        ax.grid(False)
```

-continued

```
        fig.suptitle('Smoothed Returns',size=30)
        fig.subplots_adjust(top=.9,bottom=0.08,left=0.1,right=0.9m
                  hspace=0.4, wspace=0.3)
    return
```

Figure 9:
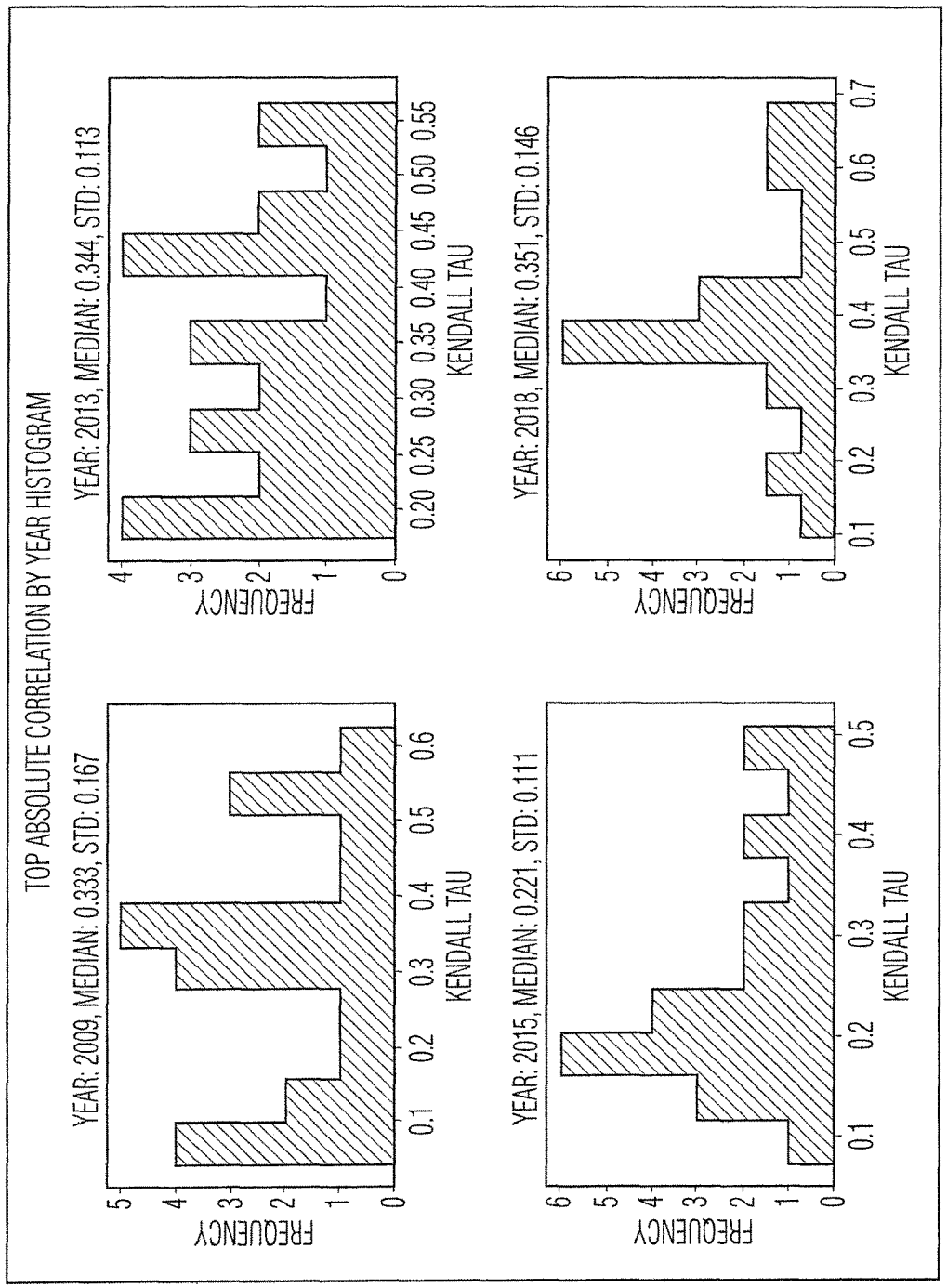
FIG. 9 is a screen shot illustrating an example graphical user interface, according to one exemplary embodiment.

FIG. 9 is a screen shot illustrating example GUI 900, according to one exemplary embodiment. As illustrated in FIG. 9, GUI 900 may include one or more histograms. Each histogram represents a correlation between one or more energy sources and one or more financial subsectors. The peaks of each histogram may represent the most correlated energy sources and financial subsectors.

Referring back to FIG. 5, at step 508, climate data analytics module 114 may identify one or more energy sources that correspond to each of the one or more financial subsectors. In some embodiments, optimization module 120 may identify the four most relevant energy sources to each of the twenty-four financial subsectors. In those embodiments in which all energy sources are equally correlated with a particular financial subsector, optimization module 120 may select those four energy sources that are the "greenest." Greenest, for example, may correspond to the energy source have the smallest Carbon footprint.

At step 510, climate data analytics module 114 may retrieve financial data related to one or more securities. For example, financial data integrator 118 may retrieve from one or more financial data sources 106 monthly return information for one or more securities.

At step 512, climate data analytics module 114 may smooth the retrieved financial information. For example, optimization module 120 may smooth the security level information using a weighted regression. Such weighting regression may include LOWESS regressions. Smoothing the retrieved financial information aids in identifying relationships among variables, as well as trends in the information.

At step 514, climate data analytics module 114 may map the one or more securities to a respective financial subsector. For example, optimization module 120 may identify one or more financial subsectors to which each respective securities applies. In some embodiments, climate data analytics module 114 may procure economic classification data for a given security, such as, without being limited to, economic classification according to the Global Industry Classification Standard (GIGS). Each economic sector may be mapped to a subset of an energy source. Using this mapping, climate data analytics module 114 may map each security to a given energy source from a financial subsector of its economic sector.

At step 516, climate data analytics module 114 may correlate the security level information with the mappings from step 508. For example, optimization module 120 may correlate the security level information with the four most relevant energy sources identified above in conjunction with step 508.

At step 518, climate data analytics module 114 may identify one or more energy sources that correspond to each of the one or more securities. For example, continuing with the example in step 508 above, optimization module 120 may identify the two most relevant energy sources for each of the one or more securities. In those embodiments in which three or more energy sources are equally relevant to a respective security, optimization module 120 may break any ties by, for example, selecting the "greenest" energy source.

Figure 10:
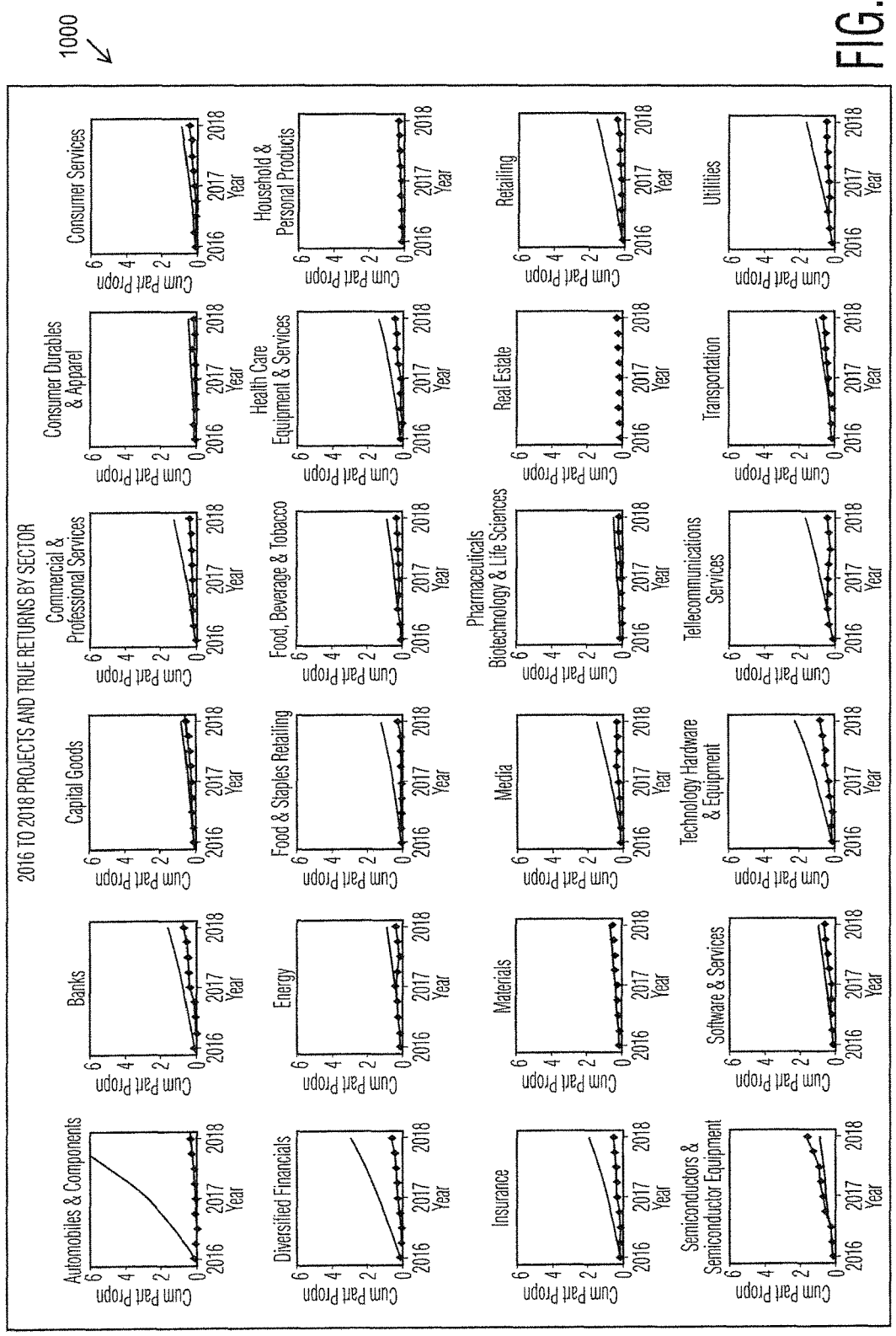
FIG. 10 is a screen shot illustrating an example graphical user interface, according to one exemplary embodiment.

FIG. 10 is a screen shot illustrating example GUI 1000, according to one exemplary embodiment. As illustrated, GUI 1000 may include one or more graphical representations of returns by subsector from 2016 to 2018. Such GUI 1000 may be accessible to user via client device 102.

Figure 6:
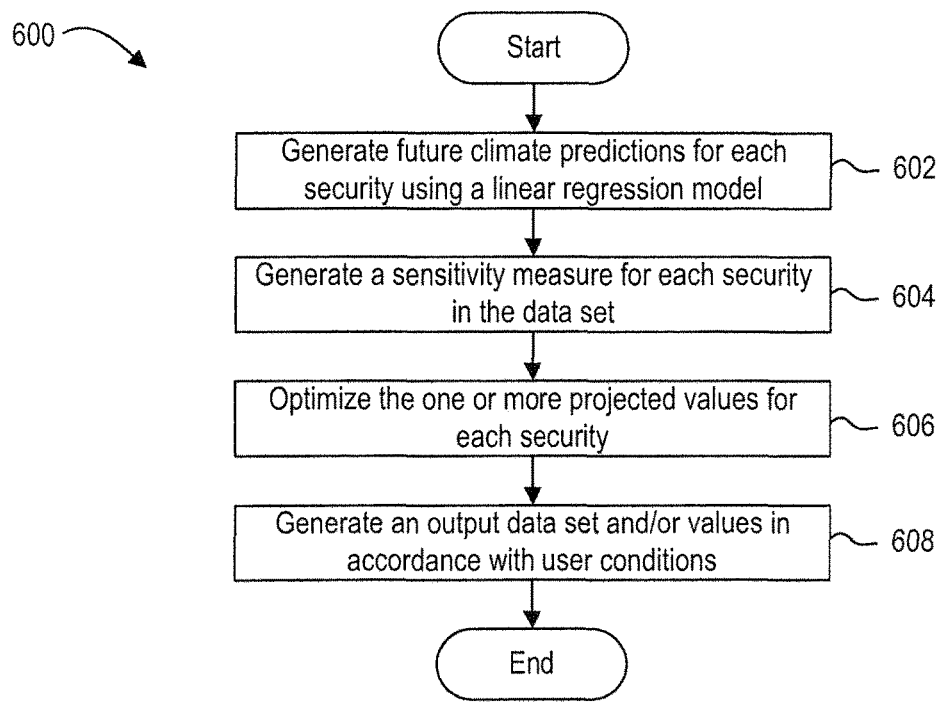
FIG. 6 is a flow diagram illustrating a method of one or more operations included in a fourth phase of the method discussed in FIG. 2, according to one exemplary embodiment.

FIG. 6 is a flow diagram illustrating a method 600 of operations during phase 208, according to one exemplary embodiment. Method 600 involves predicting future climate impact for each security (or financial subsector) and presenting that information to the requestor. In general, according to method 600, one or more mapped energy sector(s) may be used as input variable(s) to forecast a performance of a security. Method 600 may use correlations (described below) to identify energy mappings. Once energy mappings are identified, profitability indicators of the mapped energy sources (e.g., a ROI) may be used as an input (e.g., explanatory variables) to predict scenario-specific return performance of the securities. Method 600 may begin at step 602.

At step 602, climate data analytics module 114 may be configured to generate future climate predictions for each security using a regression model. Such regression models may include a linear regression model. For example, climate data analytics module 114 may use the identified energy mappings by identifying one or more profitability indicators associated with a given security. As input to the regression model, climate data analytics module 114 may provide the one or more profitability indicators to predict a scenario-specific return performance for the security. Further, in some embodiments, for each security, output module 122 may retrieve climate data generated by climate module 130 for each mapped energy source. In some embodiments, output module 122 may retrieve the climate data according to one or more selected scenarios. The retrieved climate data includes future climate data projections. Output module 122 may then project the future climate impact for each security using the future climate data projections and historical price returns by leveraging one or more linear regression algorithms. The projections may be compiled in a data set to be provided to the user.

At step 604, output module 122 may generate a sensitivity measure for each security by analyzing the spread of each security's projected returns across each of the given scenarios.

In some embodiments, output module 122 may generate one or more scores for each securities' returns across one or more scenarios. For example, output module 122 may generate three scores for each of a business as usual (BAU) scenario, a carbon max scenario, and a carbon min scenario.

In some embodiments, output module 122 may generate a spread of a security's expected performance using expected returns. A higher spread indicates a higher sensitivity towards economic and policy changes. A low spread indicates lower risk towards these changes. A min max area value indicates the min max area value for stocks in a security's portfolio. A min max area value may be calculated using:

$$MMA_s = \frac{1}{|\overline{R}_s(BAU)|} \left| \sum_{t=t*}^{T} R_{x,ts} - R_{m,ts} \right|$$

where $t^* > TOD$(Time of Day), $R_{x,ts}$ are expected returns computing using regression to carbon max scenario, and $R_{m,ts}$ are expected returns computing using carbon min scenario.

In some embodiments, output module 122 may generate a min max draw down score. The min max draw down score may reflect the spread of a constituent's expected performance as computed using Expected Returns for the Carbon Minimum and Carbon Maximum scenarios. A higher spread may be indicative of a higher risk towards economic and policy changes.

In some embodiments, output module 122 may generate an affinity towards carbon minimum score (ACM). The ACM may reflect the spread of difference between the expected returns for the carbon minimum scenario and the expected returns of the business as usual scenario. A positive score for the ACM may indicate that a constituent is expected to perform better a carbon minimum scenario. A negative score for the ACM may indicate that the constituent is expected to perform better for a carbon maximum scenario.

The ACM may be defined as follows:

$$ACM_S = \frac{1}{|\overline{R}_s(BAU)|} \sum_{t=t*}^{T} (R_{m,ts}, R_{BAU,ts})$$

where $t^* > TOD$ (Time of Deviation), $R_{BAU,ts}$ are the expected returns computed using a regression to carbon business as usual scenario, $R_{m,ts}$ are the expected returns computed using a carbon min scenario, and $\overline{R}_S$ are the mean returns computed using the business as usual scenario.

In one embodiment, output module 122 may generate an affinity towards carbon maximum score (AXM). The AXM may reflect the spread of difference between the expected returns for the carbon maximum scenario and the expected returns of the business as usual scenario. A positive AXM may indicate that a constituent is expected to perform better under a carbon maximum scenario while a negative score may indicate that a constituent is expected to perform better under a carbon minimum scenario.

The AXM may be defined as follows:

$$AXM_s = \frac{1}{|\overline{R}_s(BAU)|} \sum_{t=t*}^{T} (R_{X,ts}, R_{BAU,ts})$$

where $t^* > TOD$ (Time of Deviation) $R_{x,ts}$ are the expected returns computed using a regression to carbon max scenario, $R_{BAU,ts}$ are the expected returns computed using a business as usual scenario, and $\overline{R}_S(BAU)$ are the expected returns computed using the business as usual scenario.

In some embodiments, output module 120 may compute the securities' energy dependency using specialized software that is configured for computationally intensive calculations. In one embodiment, python Scikit-learn may be used to run multiple support vector machine (SVM) regressions in order to compute the constituents' energy dependency. SVMs may be used for their effectiveness in high dimensional spaces, ability to be run in cases where the number of dimensions is greater than the number of samples. SVMs may also be memory efficient as they may use support vectors including a subset of training points in the training function. Additionally SVMs may be versatile as different kernel functions can be specified for the decision function.

At step 606, output module 122 may optimize the one or more projected values for each security. For example, output module 122 may generate one or more data sets that comprise the one or more projected values for each security. Such optimization equation may be:

$$\gamma \dot{W}\overline{R} - (1-\gamma)\dot{W}\Sigma W$$

where $\gamma \in (0,1) | \forall_s \in S$, $w_s \geq 0.001$ (Min weight constraint), $w_s \leq 0.05$ (Max weight constraint), and $\Sigma w_s = 1.0$ In one embodiment, output module 122 may use securities sensitivities as a constraint and optimize the data set using a Markowitz Optimization Process. In one embodiment, statistical analysis and big data may be used to determine the objective function in the Markowitz Optimization process. In one embodiment, a convex optimizer package with a beta reduction component may be used. In general, any suitable optimization model may be used to optimize the data in accordance with embodiments described herein.

In some embodiments, output module 122 may optimize the data set for higher returns, less risk and higher carbon reductions. Output module 122 may provide a weighting for constituents of the data set such that any data set constructed from the provided weightings would have a lower aggregate climate risk in comparison to the benchmark.

In some embodiments, output module 122 may optimize the data set towards preferred scenarios. For example, if a user were interested in investing in a portfolio that outperforms in carbon-min scenario output module 122 may re-weight the securities in accordance with the user's socio-economic, policy and climate preferences.

In some embodiments, output module 122 may utilize a convex optimization utility that is based on Python. For example, output module 122 may use a Basic Linear Algebra Subprograms (BLAS) that are capable of efficiently performing matrix based mathematical operations; thereby allowing the output module 122 to optimize larger amounts of data using algorithms that utilize matrices without taxing either the processor or memory components of the server system 102. In addition or as an alternative, output module 122 may solve a non-convex optimization problem using a Generalized Simulated Annealing for Global Optimization package. In one embodiment, output module 122 may analyze the conditional value at risk to assess the likelihood that a specific loss will exceed the value at risk.

In some embodiments, output module 122 may optimize the data set and provide a set of weights. The set of weights may be generated on various time scales including every week, month, quarter, or year. The weights may be used to compute indexes, portfolios, and holdings for exchange traded funds.

In one embodiment, the weightings produced by output module 122 may be used to construct smart climate indices that are designed to track well established global indices such as the S&P500, Russell 1000 and the like. However, the smart climate indices may be optimized to lower beta, volatility and tracking error while increasing climate impact and financial performance. The smart climate indices may also be used for ETF creation and benchmarked performance evaluations.

In some embodiments, the weightings produced by the output module 122 may be used to construct a sensitivity restricted portfolio. The sensitivity restricted portfolio may be configured to maximize the returns of the portfolio subject to an ESG based constraint and an Energy Mix Transition Risk (EMTR) score constraint.

In some embodiments, the weightings produced by the output module 122 may be used to construct a carbon minimum biased portfolio by maximizing the returns of the portfolio subject to an ESG based constraints and an ACM constraint.

In some embodiments, the weightings produced by output module 122 may be used to construct a carbon minimum biased profile by maximizing the returns of the portfolio subject to ESG constraints and an AXM constraint.

In some embodiments, the weightings produced by the output module 122 may be used to provide portfolio optimization for climate and energy volatility, and may include scenario analysis and shock testing. The weightings may be used to evaluate client portfolios and climate impact.

In some embodiments, output module 122 may provide users with new weights with no addition or subtraction of constituents from the data set. In one embodiment, output module 122 may produce optimized data sets that may provide the best opportunities for gain with the least risk, materially reduce risk of divergence in the global economy from baseline to high/low carbon scenarios, contain constituents having greater stability and improved performance under more climate friendly policies and activities, contain constituents having a lower predicted tracking error against a benchmark data set, and/or contain constituents that have the highest average carbon reductions over time frames.

At step 608, output module 122 may generate an output data set and/or values in accordance with user conditions. In some embodiments, output module 122 may output a set of weights that are provided quarterly to a separate index computation entity. The index computation entity may use the weights to compute daily index performance and provide the computed index to one or more financial portals.

In some embodiments, individual public security level risk and optimization scores (weightings and related data) produced by the climate module 130, EF converter 124, optimization module 120, and output module 122 may be provided to third parties such as data providers for inclusion into their own system.

In some embodiments, output module 122 transmit information to client device 102, such that client device may generate or render a graphical user interface (GUI) that is configured to display data and information related to the climate module 130, EF converter 124, optimization module 120, and output module 122. In some embodiments, the information may be accessible to a user via application 110 executing on client device 102.

Figure 11A:
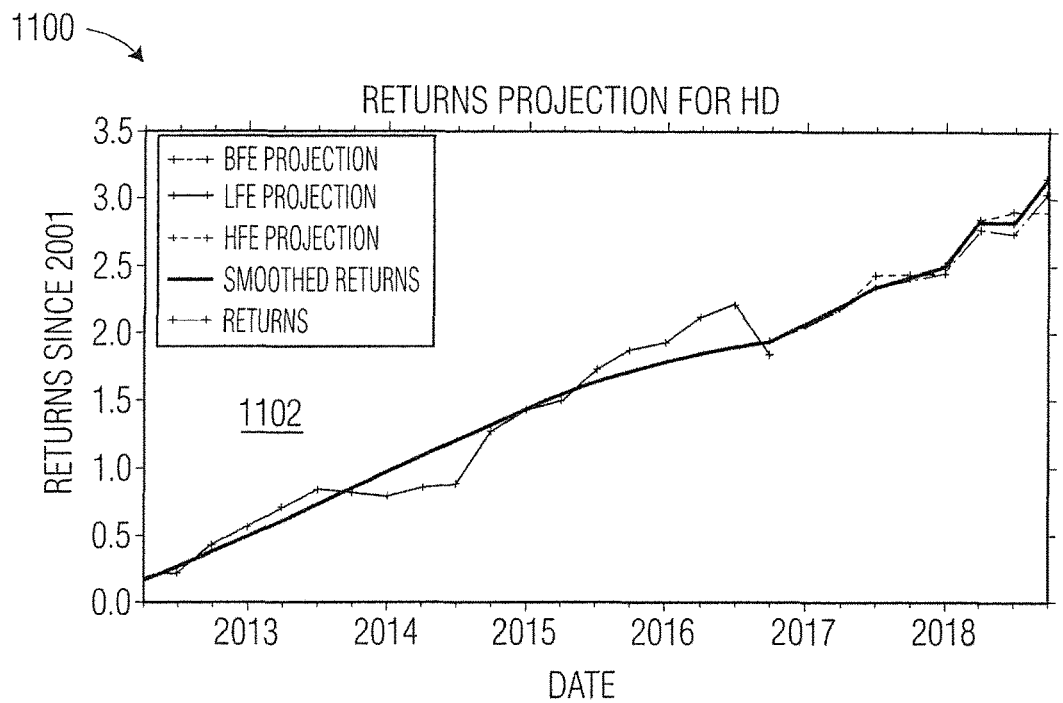
FIGS. 11A and 11B are screen shots illustrating an example graphical user interface, according to one exemplary embodiment.
Figure 11B:
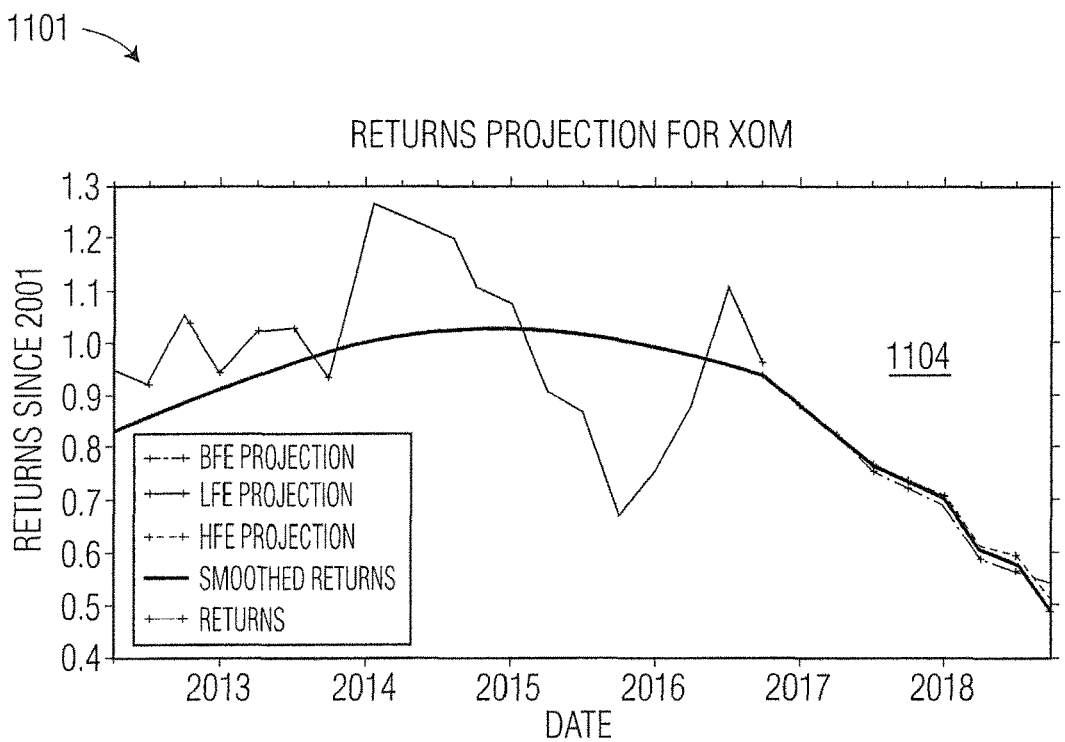

FIGS. 11A and 11B are screen shots illustrating example GUI 1100 and GUI 1101, respectively, according to one exemplary embodiment. GUI 1100 may include graph 1102. GUI 1101 may include graph 1104. Each graph 1102, 1104 may represent projections for a respective company. As illustrated, each graph 1102 and 1104 visually depicts projections for each company under a plurality of scenarios.

Figure 12:
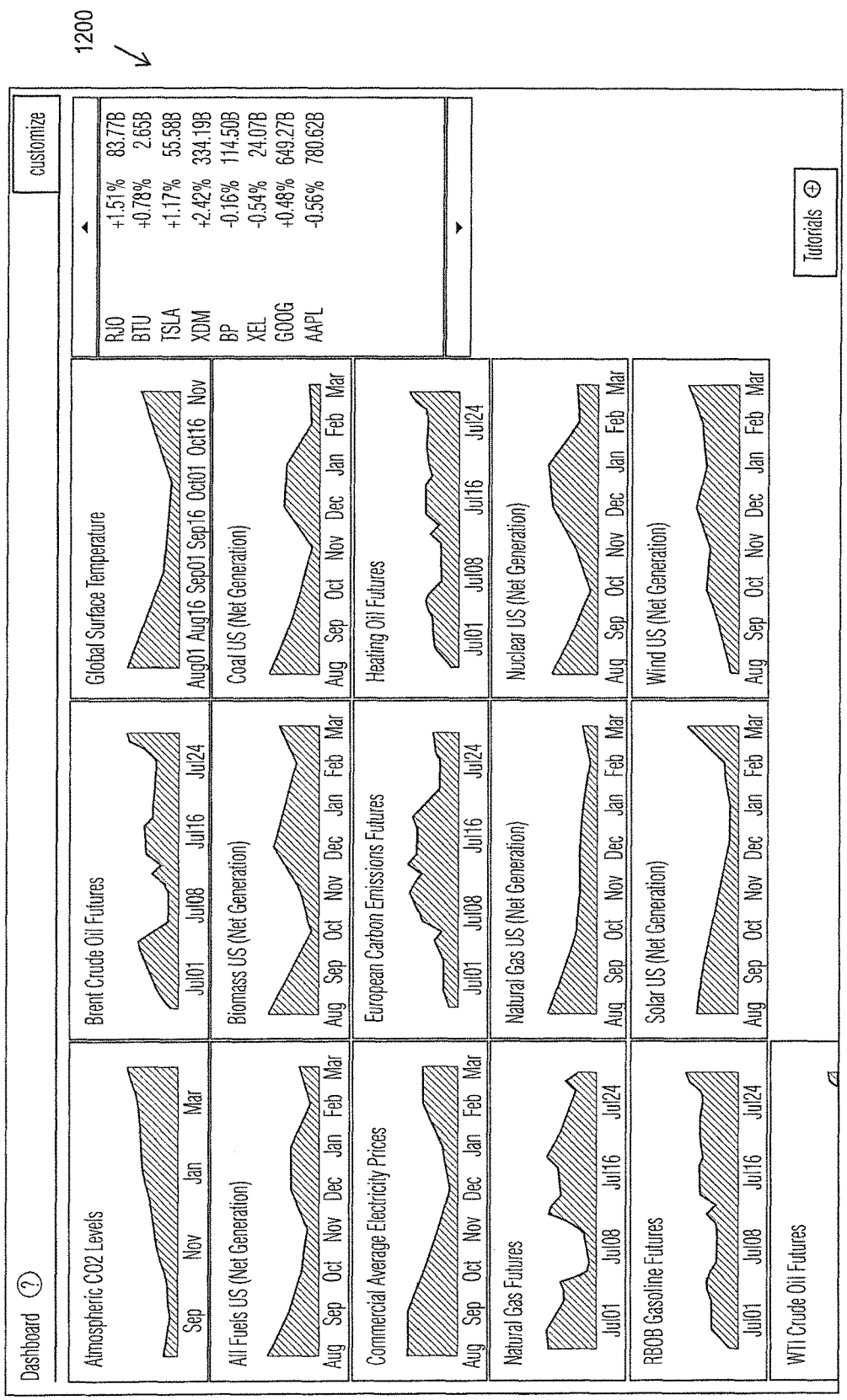
FIG. 12 is a screen shot illustrating an example graphical user interface, according to one exemplary embodiment.

FIG. 12 is a screen shot illustrating example GUI 1200, according to one exemplary embodiment. As illustrated, a user may login to a website to view a dashboard containing data and information related to climate data analytics module 104 from client device 102 via application 110. In some embodiments, the dashboard may display time series information for climate and financial data. The time series information for climate and financial data may be generated by climate data integrator 116 and financial data integrator 118. The dashboard may also display financial index information.

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer capable of performing the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with an electronic exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device.

The term "network" shall refer to any type of network or networks, including those capable of being utilized in connection with environment 100 described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

Figure 7:
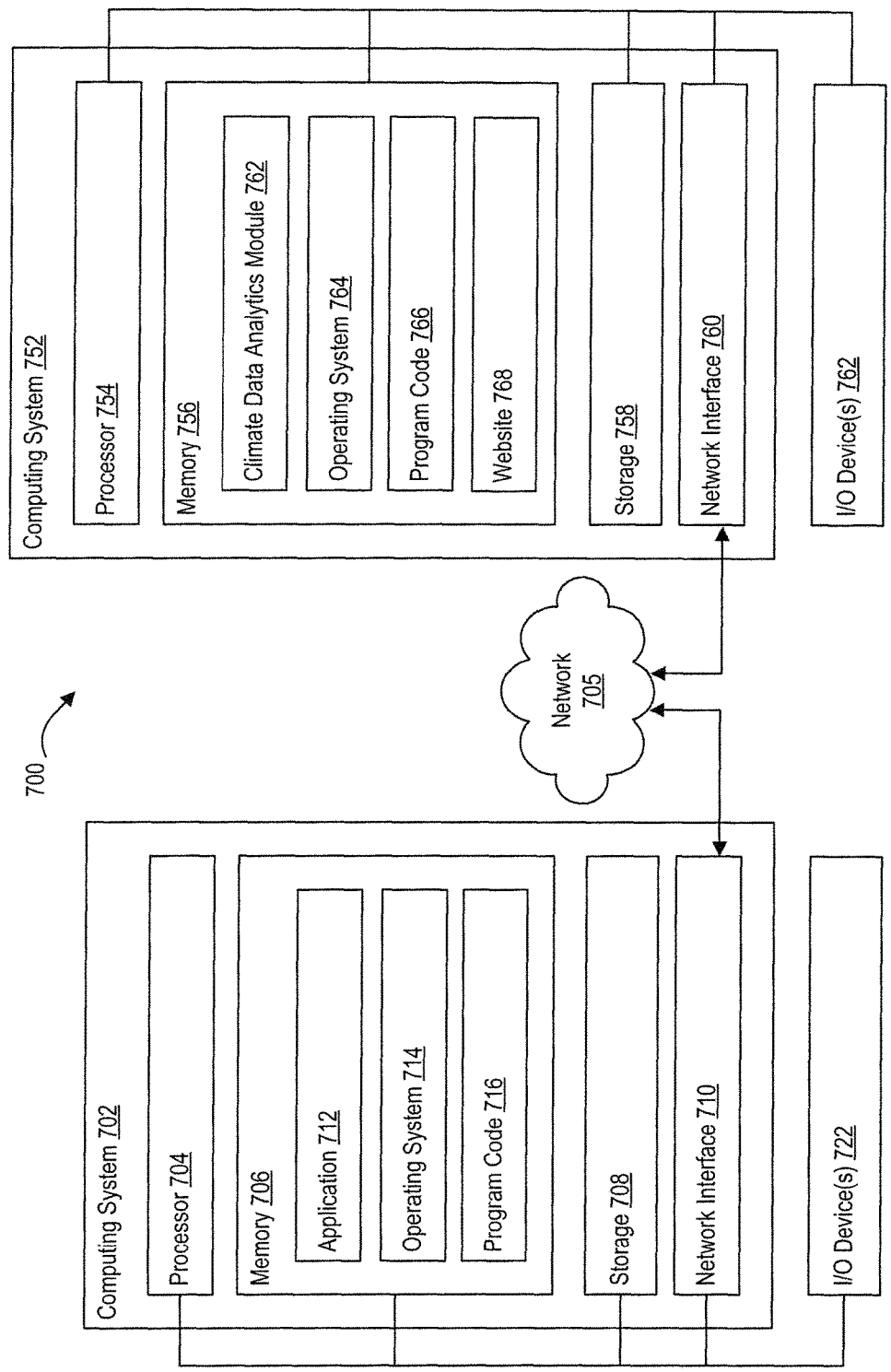
FIG. 7 is a functional block diagram illustrating a computing environment, according to one exemplary embodiment.

FIG. 7 is a block diagram illustrating an exemplary computing environment 700, according to some embodiments. Computing environment 700 includes computing system 702 and computing system 752. Computing system 702 may be representative of client device 102. Computing system 752 may be representative of organization computing system 104.

Computing system 702 may include processor 704, memory 706, storage 708, and network interface 710. In some embodiments, computing system 702 may be coupled to one or more input/output (I/O) device(s) 722 (e.g., keyboard, mouse, display, etc.).

Processor 704 may retrieve and execute program code 716 (i.e., programming instructions) stored in memory 706, as well as store and retrieve application data. Processor 704 may be included to be representative of a single processor, multiple processors, a single processor having multiple processing cores, and the like. Network interface 710 may be any type of network communications allowing computing system 702 to communicate externally via computing network 705. For example, network interface 710 may be configured to enable external communication with computing system 752.

Storage 708 may be, for example, a disk storage device. Although shown as a single unit, storage 708 may be a combination of fixed and/or removable storage devices, such as fixed disk drives, removable memory cards, optical storage, network attached storage (NAS), storage area network (SAN), and the like.

Memory 706 may include application 712, operating system 714, and program code 716. Program code 716 may be accessed by processor 704 for processing (i.e., executing program instructions). Program code 716 may include, for example, executable instructions for communicating with computing system 752 to display one or more pages of website 768. Application 712 may enable a user of computing system 702 to access a functionality of computing system 752. For example, application 712 may access content managed by computing system 752, such as website 768. The content that is displayed to a user of computing system 702 may be transmitted from computing system 752 to computing system 702, and subsequently processed by application 712 for display through a graphical user interface (GUI) of computing system 702.

Computing system 752 may include processor 754, memory 756, storage 758, and network interface 760. In some embodiments, computing system 752 may be coupled to one or more I/O device(s) 762.

Processor 754 may retrieve and execute program code 766 (i.e., programming instructions) stored in memory 756, as well as store and retrieve application data. Processor 754 is included to be representative of a single processor, multiple processors, a single processor having multiple processing cores, and the like. Network interface 760 may be any type of network communications enabling computing system 752 to communicate externally via computing network 705. For example, network interface 760 allows computing system 752 to communicate with computer system 702.

Storage 758 may be, for example, a disk storage device. Although shown as a single unit, storage 758 may be a combination of fixed and/or removable storage devices, such as fixed disk drives, removable memory cards, optical storage, network attached storage (NAS), storage area network (SAN), and the like.

Memory 756 may include climate data analytics module 762, operating system 764, program code 766, and website 768. Program code 766 may be accessed by processor 754 for processing (i.e., executing program instructions). Program code 766 may include, for example, executable instructions configured to perform steps discussed above in conjunction with FIGS. 2-6. As an example, processor 754 may access program code 766 to perform operations for assessing climate change risk at a security level. Website 768 may be accessed by computing system 702. For example, website 768 may include content accessed by computing system 702 via a web browser or application.

Climate data analytics module 762 may be configured to predict the environmental performance of one or more companies based one or more energy sources. For example, climate data analytics module 762 may generate one or more environmental metrics for each energy source based on one or more scenarios selected by an end user. Climate data analytics module 762 may then convert the generated climate data for each energy source into one or more profitability indicators. The climate data to financial data conversion allows climate data analytics module 762 to downward correlate each energy source to a respective industry subsector using historical price returns of each industry subsector. Within each industry subsector, the present system can identify one or more companies to which each energy source maps. From this information, the present system is able to assess climate change risk associated with each company based on operations of the company.

Figure 13:
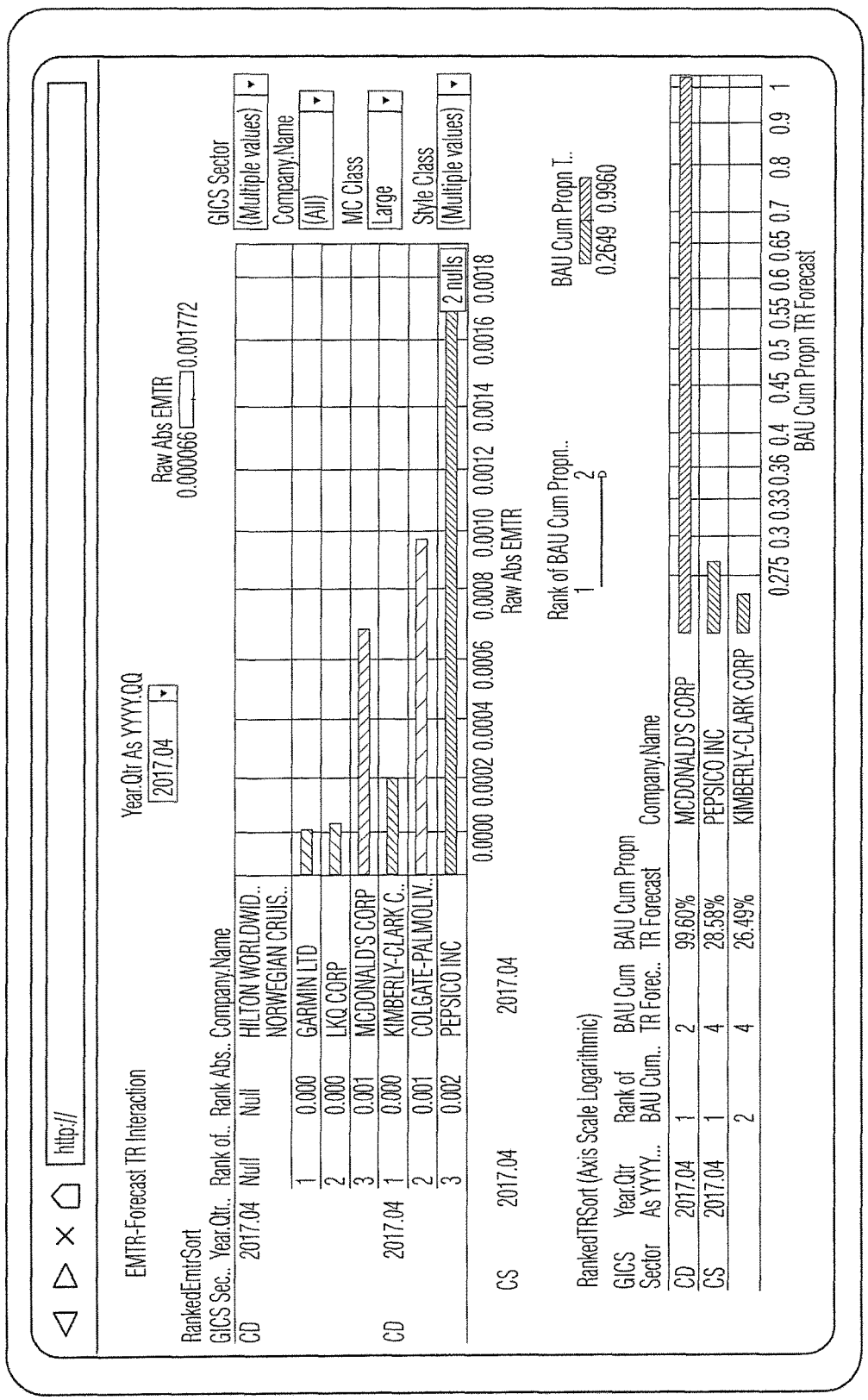
FIG. 13 is a screen shot illustrating an example graphical user interface, according to one exemplary embodiment.
Figure 14:
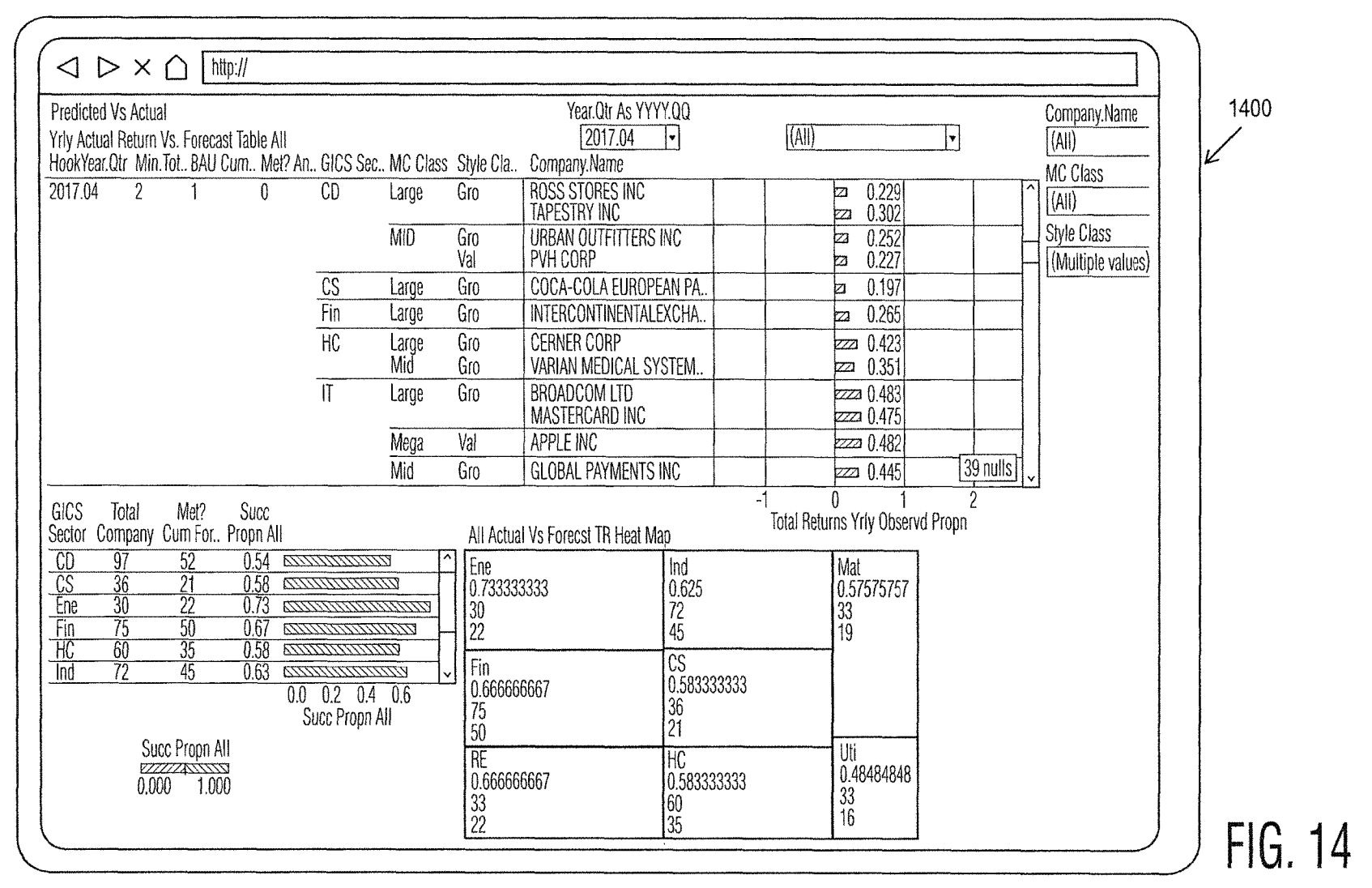

Referring next to FIGS. 13 and 14, example graphical user interfaces illustrating various scenario-predictive/forecast return performance indicators that may be created by climate data analytics module 114. FIG. 13 is a screen shot illustrating an example graphical user interface (GUI) 1300, according to one exemplary embodiment. As illustrated, GUI 1300 may represent a user interface that may be generated by climate data analytics module 114 to illustrate one or more outputs of climate data analytics module 114. For example, an energy mixed transition risk-forecast transition risk interaction may be displayed via GUI 1300. As illustrated, climate data analytics module 114 may integrate one or more outputs generated, for example, using the one or more operations discussed above in conjunction with FIGS. 2-6 with traditional stock screening variables that may be retrieved using financial data integrator 118.

Via GUI 1300, an end user may be able to filter various stocks using traditional stock characters, such as, but not limited to, market cap, GICS economic sector, and style, along with one or more climate risk scores and rankings generated by climate data analytics module 114. Accordingly, GUI 1300 provides an integrated interface that allows users to filter stock information based on climate risk scores and ranking, as well as more traditional financial variables. Conventional systems are simply unable to produce such an interface due to inaccuracies in reported environmental data, and non-uniformity in the portions of environmental data that are accurate.

Climate data analytics module 114 may transmit the generated GUI 1300 to, for example, client device 102, such that client device 102 may render GUI 1300 and display GUI 1300 to the user via a display of client device 102. For example, client device 102 may display GUI 1300 via application 110 executing thereon.

FIG. 14 is a screen shot illustrating an example graphical user interface (GUI) 1400, according to one exemplary embodiment. As illustrated, GUI 1400 may represent a user interface that may be generated by climate data analytics module 114 to illustrate one or more outputs of climate data analytics module 114. For example, GUI 1400 may include a comparison between actual and forecasted stock performance.

Climate data analytics module 114 may transmit the generated GUI 1400 to, for example, client device 102, such that client device 102 may render GUI 1400 and display GUI 1400 to the user via a display of client device 102. For example, client device 102 may display GUI 1400 via application 110 executing thereon.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system, comprising:
    a processor; and
    a memory having programming instructions stored thereon, which, when executed by the processor, causes the processor to perform an operation, comprising:
        receiving, via at least one network, a selection of a climate change and energy scenario from a user operating a remote client device;
        generating one or more environmental metrics for one or more energy sources based on the climate change scenario selected by the user;
        converting the one or more environmental metrics for the one or more energy sources into one or more profitability indicators by simulating a climate change impact of each energy source using one or more metrics associated with the selected climate scenario;
        retrieving, over the at least one network, two or more sets of financial information directed to two or more securities from one or more remote financial data sources;
        correlating at least one energy source of the one or more energy sources to each security of the two or more securities, by downward deploying the one or more profitability indicators of the one or more energy sources to the two or more sets of financial information of each security;
        generating a projected climate change risk for each security of the two or more securities based on the one or more environmental metrics for the one or more energy sources; and
        providing a data set representing the projected climate change risk to the remote client device to evaluate and forecast return performance for a given portfolio of investments for multiple climate and energy pathways.

2. The system of claim 1, wherein simulating the climate change impact of each energy source using the one or more metrics associated with the selected climate change scenario comprises:
estimating a future price and demand of each energy source using a system of difference equations.

3. The system of claim 1, wherein the one or more profitability indicators include at least one of an absolute annualized capital cost, an absolute variable cost, an absolute revenue, a gross margin, a unit gross margin, a net present value (NPV), an internal rate of return (IRR), and a return on investment (ROI).

4. The system of claim 1, wherein the processor is configured to correlate the at least one energy source of the one or more energy sources to each security of the two or more securities, by:
mapping the at least one energy source with at least one financial subsector; and
ranking a relevance of each energy source to the at least one financial subsector related to scenarios or predictive forecasts, wherein each predictive forecast translates an impact of global price movements and changes in energy pathways on predictive price returns of the at least one financial subsector.

5. The system of claim 4, wherein the processor is further configured to:
identify the two or more securities associated with each financial subsector;
correlate each energy source mapped to each financial subsector with the identified two or more securities associated with each financial subsector; and
rank a relevance of each energy source with each of the identified two or more securities associated with each financial subsector, thus allowing translations of changes in global climate and energy pathways on a price return of securities and generating of a potential of scenario analysis that predicts security level price return performance for multiple potential future changes in climate and energy pathways.

6. The system of claim 1, wherein the processor is configured to generate the projected climate change risk for each security based on the one or more environmental metrics for one or more energy sources, by:
retrieving historical price returns for each security from the one or more financial data sources.

7. The system of claim 6, wherein the processor is further configured to:
identify the one or more environmental metrics associated with each respective energy source; and
generate a future environmental impact for each security using a linear regression algorithm with the identified one or more environmental metrics and the retrieved historical prices returns of each security.

8. A computer-implemented method of assessing climate change risk at a security level using combinations of relationships between forecasts or scenarios and security level return data, comprising:
receiving, by a computing system comprising a processor and a memory, the memory comprising a climate data analytics module executable by the processor, via at least one network, a selection of a climate change scenario from a user operating a remote client device;
generating, by the processor of computing system, one or more environmental metrics for one or more energy sources based on the climate change scenario selected by the user;
converting, by the processor of the computing system, the one or more environmental metrics for the one or more energy sources into one or more profitability indicators by simulating a climate change impact of each energy source using one or more metrics associated with the selected climate scenario;
retrieving, by the processor of the computing system, over the at least one network, two or more sets of financial information directed to two or more securities from one or more remote financial data sources;
correlating, by the processor of the computing system, at least one energy source of the one or more energy sources to each security of the two or more securities, by downward deploying the one or more profitability indicators of the one or more energy sources to the two or more sets of financial information or price returns data of each security;
generating, by the processor of the computing system, a projected climate change risk for each security of the two or more securities based on the one or more climate scenarios for the one or more energy sources; and
providing, by the processor of the computing system, a data set representing the projected climate change risk, wherein the data set comprises a ranking related to return forecasts for the climate change scenario to the remote client device.

9. The computer-implemented method of claim 8, wherein simulating the climate change impact of each energy source using the one or more metrics associated with the selected climate change scenario comprises:
estimating a future price demand, and cost of each energy source using a system of difference equations.

10. The computer-implemented method of claim 8, wherein the one or more profitability indicators include at least one of an absolute annualized capital cost, an absolute variable cost, an absolute revenue, a gross margin, a unit gross margin, a net present value (NPV), an internal rate of return (IRR), and a return on investment (ROI).

11. The computer-implemented method of claim 8, wherein the correlating of the at least one energy source of the one or more energy sources to each security of the two or more securities further comprises:
mapping the at least one energy source with at least one financial subsector; and
ranking a relevance of each energy source to the at least one financial subsector.

12. The computer-implemented method of claim 11, the method further comprising:
identifying the two or more securities associated with each financial subsector;
correlating each energy source mapped to each financial subsector with the identified two or more securities associated with each financial subsector; and
ranking a relevance of each energy source with each of the identified two or more securities associated with each financial subsector to measure a security's transition risk from a current business as usual (BAU) scenario to user preferred scenarios to measure transitions from high-carbon economy to a low-carbon economy.

13. The computer-implemented method of claim 8, wherein the generating of the projected climate change risk for each security based on the one or more environmental metrics for one or more energy sources further comprises:
retrieving historical price returns for each security from the one or more financial data sources.

14. The computer-implemented method of claim 13, the method further comprising:

identifying the one or more environmental metrics associated with each respective energy source; and generating a future environmental impact for each security using a linear regression algorithm with the identified one or more environmental metrics and the retrieved historical prices returns of each security.

15. A non-transitory computer readable medium having instructions stored thereon, which, when executed by a processor, cause the processor to perform an operation of assessing climate change risk at a security level to measure a security's transition risk from current Business As Usual (BAU) scenarios to user preferred future climate scenario and from a high-carbon economy to a low-carbon economy, the operation comprising:

receiving, via at least one network, a selection of a climate change scenario from a user operating a remote client device;

generating one or more environmental metrics for one or more energy sources based on the climate change scenario selected by the user;

converting the one or more environmental metrics for the one or more energy sources into one or more profitability indicators by simulating a climate change impact of each energy source using one or more metrics associated with the selected climate and energy forecasts or scenario;

retrieving, over the at least one network, two or more sets of financial information directed to two or more securities from one or more remote financial data sources;

correlating at least one energy source of the one or more energy sources to each security of the two or more securities, by downward deploying the one or more profitability indicators of the one or more energy sources to the two or more sets of financial information of each security;

generating a projected forward looking climate change risk for each security of the two or more securities based on the one or more environmental metrics for the one or more energy sources; and providing a data set representing the projected climate change risk to the remote client device.

16. The non-transitory computer readable medium of claim 15, wherein simulating the climate change impact of each energy source using the one or more metrics associated with the selected climate change scenario comprises:

estimating a future price and demand of each energy source using a system of difference equations.

17. The non-transitory computer readable medium of claim 15, wherein the one or more profitability indicators include at least one of an absolute annualized capital cost, an absolute variable cost, an absolute revenue, gross margin, a unit gross margin, a net present value (NPV), an internal rate of return (IRR), and a return on investment (ROI).

18. The non-transitory computer readable medium of claim 15, wherein the correlating of the at least one energy source of the one or more energy sources to each security of the two or more securities further comprises:

mapping the at least one energy source with at least one financial subsector; and ranking a relevance of each energy source to the at least one financial subsector.

19. The non-transitory computer readable medium of claim 18, wherein the operation further comprises:

identifying the two or more securities associated with each financial subsector;

correlating each energy source mapped to each financial subsector with the identified two or more securities associated with each financial subsector; and ranking a relevance of each energy source with each of the identified two or more securities associated with each financial subsector.

20. The non-transitory computer readable medium of claim 15, wherein the generating of the projected climate change risk for each security based on the one or more environmental metrics for one or more energy sources further comprises:

retrieving historical price returns for each security from the one or more financial data sources;

identifying the one or more environmental metrics associated with each respective energy source; and generating a future environmental impact for each security using a linear regression algorithm with the identified one or more environmental metrics and the retrieved historical prices returns of each security.

* * * * *